US011711502B2

(12) United States Patent
Lee et al.

(10) Patent No.: US 11,711,502 B2
(45) Date of Patent: Jul. 25, 2023

(54) METHOD OF OUTPUTTING THREE-DIMENSIONAL IMAGE AND ELECTRONIC DEVICE PERFORMING THE METHOD

(71) Applicant: SAMSUNG ELECTRONICS CO., LTD., Suwon-si (KR)

(72) Inventors: Seok Lee, Hwaseong-si (KR); Juyong Park, Seongnam-si (KR); Dong Kyung Nam, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 88 days.

(21) Appl. No.: 17/361,936

(22) Filed: Jun. 29, 2021

(65) Prior Publication Data

US 2021/0329210 A1    Oct. 21, 2021

Related U.S. Application Data

(63) Continuation of application No. 16/446,102, filed on Jun. 19, 2019, now Pat. No. 11,070,782.

(30) Foreign Application Priority Data

Dec. 3, 2018  (KR) .................. 10-2018-0153425

(51) Int. Cl.
*G06T 7/70* (2017.01)
*G06T 15/00* (2011.01)
*G06T 15/20* (2011.01)
*H04N 13/117* (2018.01)
*H04N 13/366* (2018.01)
(Continued)

(52) U.S. Cl.
CPC ....... *H04N 13/117* (2018.05); *G02B 27/0101* (2013.01); *G06T 15/005* (2013.01);
(Continued)

(58) Field of Classification Search
CPC .............. B60K 35/00; B60K 2370/149; B60K 2370/1529; B60K 2370/1531; B60K 2370/31; B60K 2370/334; G02B 27/0101; G02B 27/225; G02B 27/2214; G02B 2027/0134; G02B 2027/0138; G06F 3/013; G06T 7/593; G06T 15/005; G06T 15/06; G06T 15/205; G06T 2207/10012; G09G 5/14; H04N 13/00; H04N 13/117;
(Continued)

(56) References Cited

U.S. PATENT DOCUMENTS

| 8,494,215 B2 | 7/2013 | Kimchi et al. |
| 9,684,166 B2 | 6/2017 | Kuehne |

(Continued)

FOREIGN PATENT DOCUMENTS

| KR | 10-1359660 B1 | 2/2014 |
| KR | 10-1409846 B1 | 6/2014 |

(Continued)

*Primary Examiner* — Diane M Wills
(74) *Attorney, Agent, or Firm* — Sughrue Mion, PLLC

(57) ABSTRACT

A method and apparatus for outputting a three-dimensional (3D) image are provided. To output a 3D image, a stereo image is generated based on viewpoints of a user and rendered into a 3D image. Since the stereo image is generated based on the viewpoints of the user, the user views a different side of an object appearing in the 3D image depending on a viewpoint of the user.

20 Claims, 21 Drawing Sheets

(51) Int. Cl.
*G02B 27/01* (2006.01)
*B60K 35/00* (2006.01)
*H04N 13/00* (2018.01)

(52) U.S. Cl.
CPC ........... *H04N 13/366* (2018.05); *B60K 35/00* (2013.01); *B60K 2370/1529* (2019.05); *B60K 2370/1531* (2019.05); *B60K 2370/31* (2019.05); *B60K 2370/334* (2019.05); *G02B 2027/014* (2013.01); *G02B 2027/0134* (2013.01); *G02B 2027/0138* (2013.01); *G06T 7/70* (2017.01); *G06T 15/205* (2013.01); *H04N 2013/0081* (2013.01)

(58) Field of Classification Search
CPC .... H04N 13/302; H04N 13/305; H04N 13/31; H04N 13/32; H04N 13/366; H04N 13/376; H04N 13/383; H04N 2013/0074; H04N 2013/0081

See application file for complete search history.

(56) References Cited

U.S. PATENT DOCUMENTS

| | | |
|---|---|---|
| 9,762,895 B1 | 9/2017 | Henry et al. |
| 2002/0109701 A1 | 8/2002 | Deering |
| 2011/0304699 A1* | 12/2011 | Ito .................. H04N 13/117 348/47 |
| 2013/0128012 A1 | 5/2013 | Turner |
| 2014/0049622 A1 | 2/2014 | Tsurumi et al. |
| 2014/0232746 A1 | 8/2014 | Ro et al. |
| 2015/0062311 A1* | 3/2015 | Malzbender ......... H04N 13/383 348/51 |
| 2016/0198148 A1 | 7/2016 | Asai |
| 2017/0085867 A1* | 3/2017 | Baran .................. H04N 13/122 |
| 2017/0098333 A1 | 4/2017 | Varga |
| 2017/0155893 A1* | 6/2017 | Mather ................ H04N 13/376 |
| 2017/0161949 A1 | 6/2017 | Seder et al. |
| 2017/0161950 A1 | 6/2017 | Seder et al. |
| 2018/0049636 A1 | 2/2018 | Miller et al. |
| 2018/0097867 A1* | 4/2018 | Pang .................. H04N 5/22541 |
| 2018/0144542 A1 | 5/2018 | Park et al. |
| 2019/0025913 A1* | 1/2019 | Cheng .................... G06F 3/013 |
| 2019/0094981 A1* | 3/2019 | Bradski .................. G06F 3/017 |
| 2019/0278972 A1 | 9/2019 | Anderson et al. |

FOREIGN PATENT DOCUMENTS

| | | | |
|---|---|---|---|
| KR | 10_20180046567 A | * 10/2016 | ........ G02B 27/0179 |
| KR | 10-2018-0046567 A | 5/2018 | |
| KR | 10-2018-0046587 | 5/2018 | |
| KR | 10-2018-0057263 A | 5/2018 | |

\* cited by examiner

400

METHOD OF OUTPUTTING THREE-DIMENSIONAL IMAGE AND ELECTRONIC DEVICE PERFORMING THE METHOD

CROSS-REFERENCE TO RELATED APPLICATION

This application is continuation of U.S. application Ser. No. 16/446,102 filed on Jun. 19, 2019, which is based on and claims priority from Korean Patent Application No. 10-2018-0153425, filed on Dec. 3, 2018 in the Korean Intellectual Property Office, the disclosure of which is incorporated herein by reference in its entirety.

BACKGROUND

1. Field

Methods and apparatuses consistent with exemplary embodiments relate to a method and apparatus for providing a three-dimensional (3D) image to a user. More particularly, exemplary embodiments relate to a method and apparatus for providing a 3D image representing augmented reality (AR) content.

2. Description of the Related Art

One of the main factors related to three-dimensional (3D) image recognition is a disparity between images viewed by both eyes of a user. Methods of providing different images to both eyes of a user may be classified into a stereoscopic type and an autostereoscopic type. The stereoscopic type method may filter a desired image through division methods that involve using a polarized light, time division, and wavelength division for differentiating a wavelength of a primary color. The autostereoscopic type method may enable images to be viewed only in a desired (or alternatively, predetermined) space using a 3D transform device, for example, a parallax barrier, a lenticular lens, or a directional backlight unit (BLU). The autostereoscopic type method may alleviate an inconvenience of wearing glasses. A 3D image is provided through an optical system such as a mirror or a lens. In this example, a direction of light is changed by the optical system. Thus, there is a need for considering a change in the direction of light when rendering a 3D image.

SUMMARY

One or more exemplary embodiments may address at least the above problems and/or disadvantages and other disadvantages not described above. Also, the exemplary embodiments are not required to overcome the disadvantages described above, and an exemplary embodiment may not overcome any of the problems described above.

According to an aspect of the disclosure, there is provided a method of outputting a three-dimensional (3D) image, the method comprising: obtaining eye position information of a user; calculating virtual viewpoints of the user with respect to an optical system based on the eye position information and optical system information corresponding to the optical system; setting at least two viewpoints within a graphic space coordinate system based on the eye position information; generating a stereo image with respect to an object to be output on a virtual screen based on the at least two viewpoints set within the graphic space coordinate system; and rendering a 3D image based on the virtual viewpoints and the stereo image to the user through the optical system.

The generating the stereo image may comprise: calculating frustum information with respect to each of the at least two viewpoints set within the graphic space coordinate system; determining a pose of the object based on pose information of a system in which the user is present; setting the object within the graphic space coordinate system by transforming the pose of the object into the graphic space coordinate system; and generating the stereo image based on the frustum information and the object set within the graphic space coordinate system.

The method may be further comprise: setting the virtual screen based on the eye position information, wherein the calculating of the frustum information comprises generating the frustum information based on the virtual screen.

The setting of the virtual screen may comprise: determining a difference between a preset first eye position and a target eye position; determining a first weight with respect to first virtual screen information preset with respect to the first eye position based on the difference between the preset first eye position and the target eye position; determining target virtual screen information with respect to the target eye position based on the first virtual screen information and the first weight; and setting the virtual screen based on the target virtual screen information.

The first eye position may be preset within an eye box set in a space within the system.

The method may further comprise: smoothing the at least two viewpoints set within the graphic space coordinate system, wherein the calculating of the frustum information comprises calculating the frustum information based on the smoothed at least two viewpoints.

The optical system may comprise a display panel configured to output the 3D image, and the virtual viewpoints are positioned in a rear portion of the display panel.

The rendering may comprise: determining virtual rays passing through a pixel on the display panel based on the virtual viewpoints; determining intersection points between the virtual rays and an optical layer; and assigning a pixel value to the pixel based on distances between optical elements of the optical layer and the intersection points.

The determining of the virtual rays may comprise determining the virtual rays based on a first refractive index of a medium between the optical layer and the display panel, and a second refractive index of a medium outside of a display device including the optical layer and the display panel.

The optical system information may further comprise information about an optical characteristic of a concave mirror or a convex lens included in the optical system.

The virtual viewpoints may correspond to a left viewpoint and a right viewpoint of the user.

The system may be a vehicle, and the virtual screen may be set outside of the vehicle.

The optical system may comprises a windshield of the vehicle.

According to another aspect of the disclosure, there is provided a non-transitory computer-readable storage medium storing instructions that, when executed by a processor, cause the processor to perform the method.

According to another aspect of the disclosure there is provided an electronic device for outputting a three-dimensional (3D) image, the electronic device comprising: a memory configured to record a program to output a 3D image; and a processor configured to execute the program to perform: calculating virtual viewpoints of a user within a system with respect to an optical system based on eye position information of the user and optical system information corresponding to the optical system; setting at least two viewpoints within a graphic space coordinate system, which is a virtual space corresponding to a real space of the system, based on the eye position information; generating a stereo image with respect to an object to be output on a virtual screen based on the at least two viewpoints set within the graphic space coordinate system; and rendering a 3D image based on the virtual viewpoints and the stereo image to the user through the optical system.

The generating the stereo image may comprise: calculating frustum information with respect to each of the at least two viewpoints set within the graphic space coordinate system; determining a pose of the object based on pose information of a system in which the user is present; setting the object within the graphic space coordinate system by transforming the pose of the object into the graphic space coordinate system; and generating the stereo image based on the frustum information and the object set within the graphic space coordinate system.

The electronic device may further comprise: a camera configured to generate the eye position information of the user within the system.

The electronic device may further comprise: a display device including a display panel configured to output the rendered 3D image.

According to another aspect of the disclosure, there is provided a method of outputting a three-dimensional (3D) image, the method comprising: obtaining eye positions of a user with respect to a camera; transforming coordinates of the eye positions into a coordinate system of a display panel; setting two viewpoints within a graphic space coordinate system by transforming the coordinates of the eye positions, transformed into the coordinate system of the display panel, into the graphic space coordinate system; generating a stereo image with respect to an object to be output based on the two viewpoints set within the graphic space coordinate system; and rendering a 3D image based on the eye positions transformed into the coordinate system of the display panel and the stereo image through the display panel.

The generating may comprise: calculating frustum information with respect to each of the two viewpoints set within the graphic space coordinate system; determining an object to be output and a pose of the object; determining a pose of the object based on pose information of a system in which the user is present; setting the object within the graphic space coordinate system by transforming the pose of the object into the graphic space coordinate system; and generating the stereo image based on the frustum information and the object set within the graphic space coordinate system.

BRIEF DESCRIPTION OF THE DRAWINGS

The above and/or other aspects will be more apparent by describing certain exemplary embodiments with reference to the accompanying drawings, in which.

DETAILED DESCRIPTION

Figure 1:
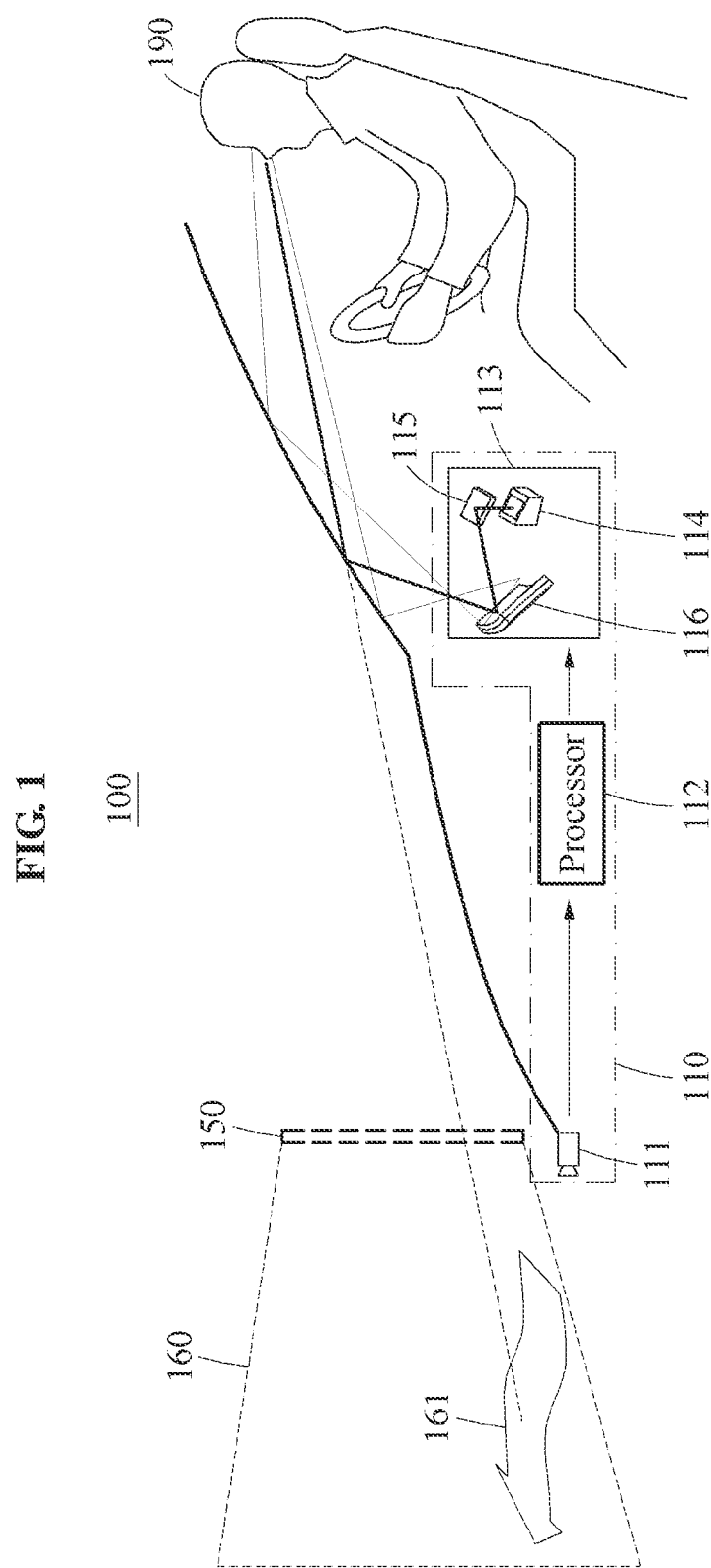
FIG. 1 illustrates a content visualizing system according to an exemplary embodiment.

Hereinafter, exemplary embodiments will be described in detail with reference to the accompanying drawings. The scope of the right, however, should not be construed as limited to the exemplary embodiments set forth herein. Like reference numerals in the drawings refer to like elements throughout the present disclosure.

Various modifications may be made to the exemplary embodiments. Here, the examples are not construed as limited to the disclosure and should be understood to include all changes, equivalents, and replacements within the idea and the technical scope of the disclosure.

The terminology used herein is for the purpose of describing particular embodiments only and is not intended to be limiting. As used herein, the singular forms are intended to include the plural forms as well, unless the context clearly indicates otherwise. It will be further understood that the terms "comprise" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Regarding the reference numerals assigned to the elements in the drawings, it should be noted that the same elements will be designated by the same reference numerals, wherever possible, even though they are shown in different drawings. Also, in the description of exemplary embodiments, detailed description of well-known related structures or functions will be omitted when it is deemed that such description will cause ambiguous interpretation of the present disclosure.

FIG. 1 illustrates a content visualizing system according to an exemplary embodiment.

A content visualizing system 100, hereinafter, simply referred to as the system 100, is a system which provides content 161 to a user 190, and may be, for example, a device provided with a content visualizing apparatus 110.

The content visualizing apparatus 110 may include a sensor 111, a processor 112, and a head-up display (HUD) 113.

The sensor 111 may include a camera and a radar. The processor 112 may detect an object in a vicinity of the content visualizing system 100 using the sensor 111. For example, a distance between the system 100 and the object may be measured. However, exemplary embodiments are not limited thereto. The processor 112 may calculate the distance to the object in the vicinity of the system 100 using the sensor 111, and generate a vicinity distance map indicating the distance to the object.

The processor 112 may generate the content 161 to be provided to the user 190 based on the detected object. When the content visualizing apparatus 110 is mounted on a vehicle, the content visualizing apparatus 110 may generate the content 161 for the user 190 based on information associated with driving. The content 161 may be used to provide information to the user 190. The information associated with driving, hereinafter, the driving information, may be information useful to a driver, such as, for example, route guidance information and driving related information. Further, the processor 112 may model the object, detect a position of the object, or recognize the object by analyzing vicinity information, for example, the distance to the object and an image including the object, sensed by the sensor 111.

The HUD 113 may visualize the content 161 in a visible region that is positioned in front of the user 190. The HUD 113 may visualize the content 161 on a windshield of the vehicle positioned in front of the user 190. The HUD 113 may form a virtual projection plane 150, hereinafter, the "virtual screen" 150. The virtual screen 150 may be a plane on which a virtual image including the content 161 generated by the HUD 113 is displayed. The user 190 may recognize the virtual image as being disposed on the virtual screen 150. The virtual screen 150 may be set to be formed outside of the vehicle.

Further, the HUD 113 may visualize the content 161 having a depth on the virtual screen 150. The processor 112 may determine a depth to which the content 161 is to be visualized based on the virtual screen 150, and the HUD 113 may visualize, based on the determined depth, the content 161 to have a depth which is relatively far away from or close to the virtual screen 150 and the user 190. The HUD 113 may visualize the content 161 having the corresponding depth in a virtual region 160 on the virtual screen 150. Here, the processor 112 may render the content 161 into a three-dimensional (3D) graphic representation based on an optical system of the HUD 113. The content 161 may be augmented reality (AR) content. The user 190 may view an AR through the content 161 represented along with a real object.

The 3D graphic representation may be a stereoscopic graphic representation having a depth. The HUD 113 may form the virtual screen 150 including a left image and a right image based on the depth of the content 161, and provide the left image to a left eye of the user 190 and the right image to a right eye of the user 190 through the virtual screen 150. Thus, the user 190 may recognize the depth of the stereoscopically rendered content 161.

The HUD 113 may include, for example, a picture generator 114, a fold mirror 115, and a concave mirror 116. However, the configuration of the HUD 113 is not limited thereto. Depending on a design, the HUD 113 may include various elements configured to form the virtual screen 150 on which a virtual image is focused through projection toward the windshield disposed in front of the user 190.

Although an example in which the content visualizing apparatus 110 is mounted on a vehicle is described herein, exemplary embodiments are not limited thereto. The content visualizing apparatus 110 may be applied to technology that combines information of a real world and information of a virtual world, such as, for example, AR glasses or mixed reality (MR).

The content visualizing apparatus 110 may continuously express the depth by adjusting the depth of the content 161, without changing a position of the virtual screen 150 formed by the HUD 113. Since a change of the position of the virtual screen 150 is not needed, the content visualizing apparatus 110 may not require a physical control of the elements included in the HUD 113. When the content visualizing apparatus 110 is mounted on a vehicle, the content visualizing apparatus 110 may dynamically visualize the 3D content 161 in front of the driver.

Figure 2:
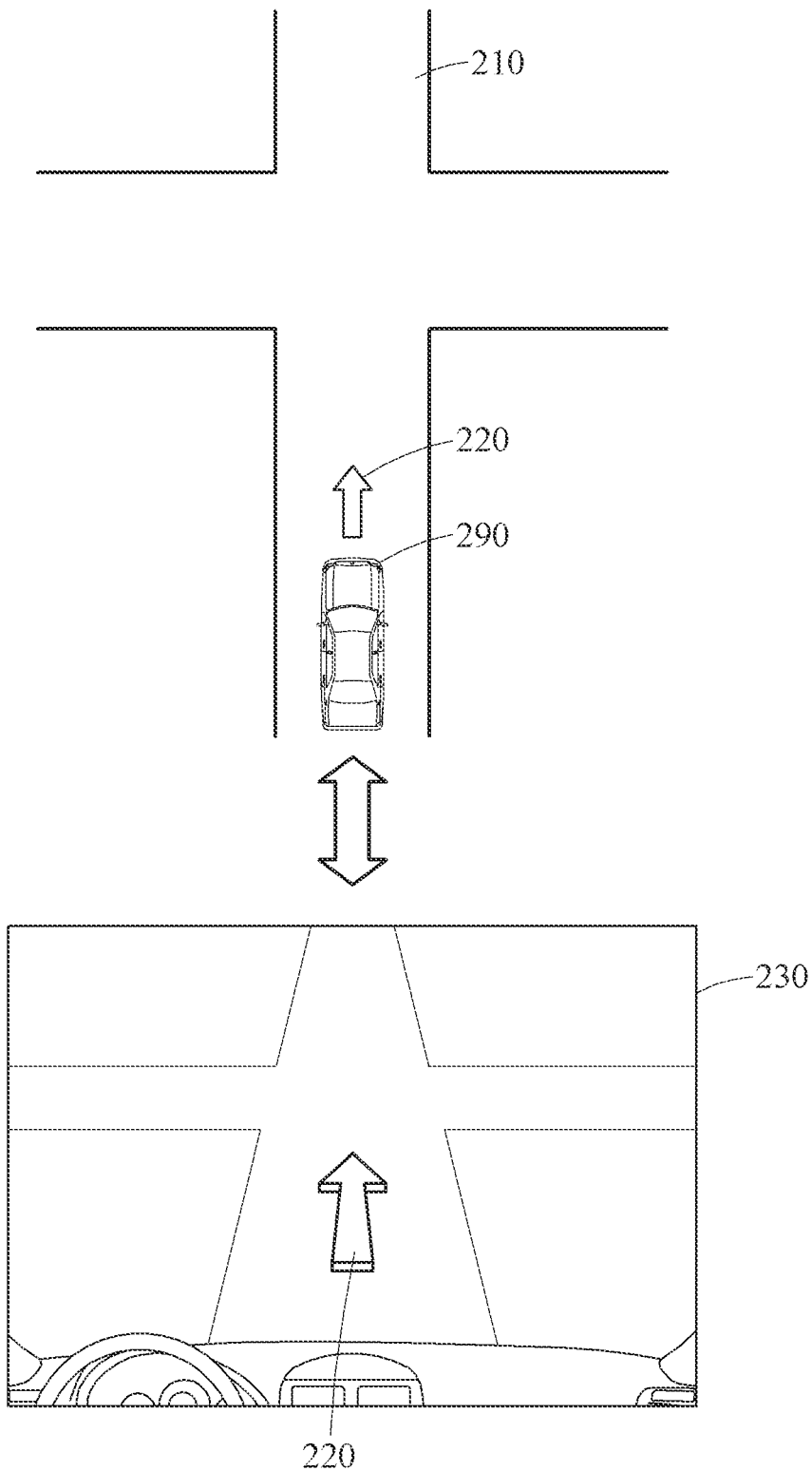
FIG. 2 illustrates route guidance content according to an exemplary embodiment.

FIG. 2 illustrates route guidance content according to an exemplary embodiment.

The content visualizing apparatus 110 of FIG. 1 may be mounted on a vehicle 290. An upper image of FIG. 2 is a top view illustrating a relationship between the vehicle 290 and a road 210, and a lower image of FIG. 2 illustrates a view 230 of a user.

The vehicle 290 may be travelling forward on the road 210. Route guidance information may indicate a straight advance, and the content visualizing apparatus 110 may visualize route guidance content 220 indicating a straight advance. The content visualizing apparatus 110 may stereoscopically visualize the route guidance content 220 in the view 230 of the user. The content visualizing apparatus 110 may form a virtual screen on which a virtual image is focused through a windshield of the vehicle 290, and visualize the route guidance content 220 through the virtual screen. The route guidance content 220 may be AR content.

When the route guidance information indicates a straight advance with respect to a current position of the vehicle 290, the content visualizing apparatus 110 may set an indication start point to be a point a first distance spaced apart from the vehicle 290, and set an indication end point to be a point a second distance spaced apart from the vehicle 290, the second distance being greater than the first distance. For example, the first distance may be designed with a diminutive length, and the second distance may be designed with a maximum visible distance that may be perceived by the user or a maximum depth that may be implemented by the content visualizing apparatus 110. However, the designs of the first distance and the second distance are not limited thereto.

The content visualizing apparatus 110 may dynamically change the indication start point and the indication end point when the vehicle 290 travels, as described above, thereby providing the route guidance content 220 fit to a road alignment. Thus, the content visualizing apparatus 110 may provide the user with the route guidance content 220 generated more intuitively based on the road alignment.

In an aspect, the route guidance content 220 may be generated such that a driver may feel the route guidance content 220 as being an object of a real world. When a different face of the route guidance content 220 is represented to the user in response to a change in a viewpoint of the driver viewing the route guidance content 220, the driver may feel the route guidance content 220 as being a real object. For example, when a right face of the route guidance content 220 is shown more in response to the viewpoint of the user moving more to the right side, the user may feel the route guidance content 220 as being positioned in a physical space. A method of generating and outputting a 3D image to provide the user with realistic content such as the route guidance content 220 will be described further with reference to FIGS. 3, and 13 through 21.

Figure 3:
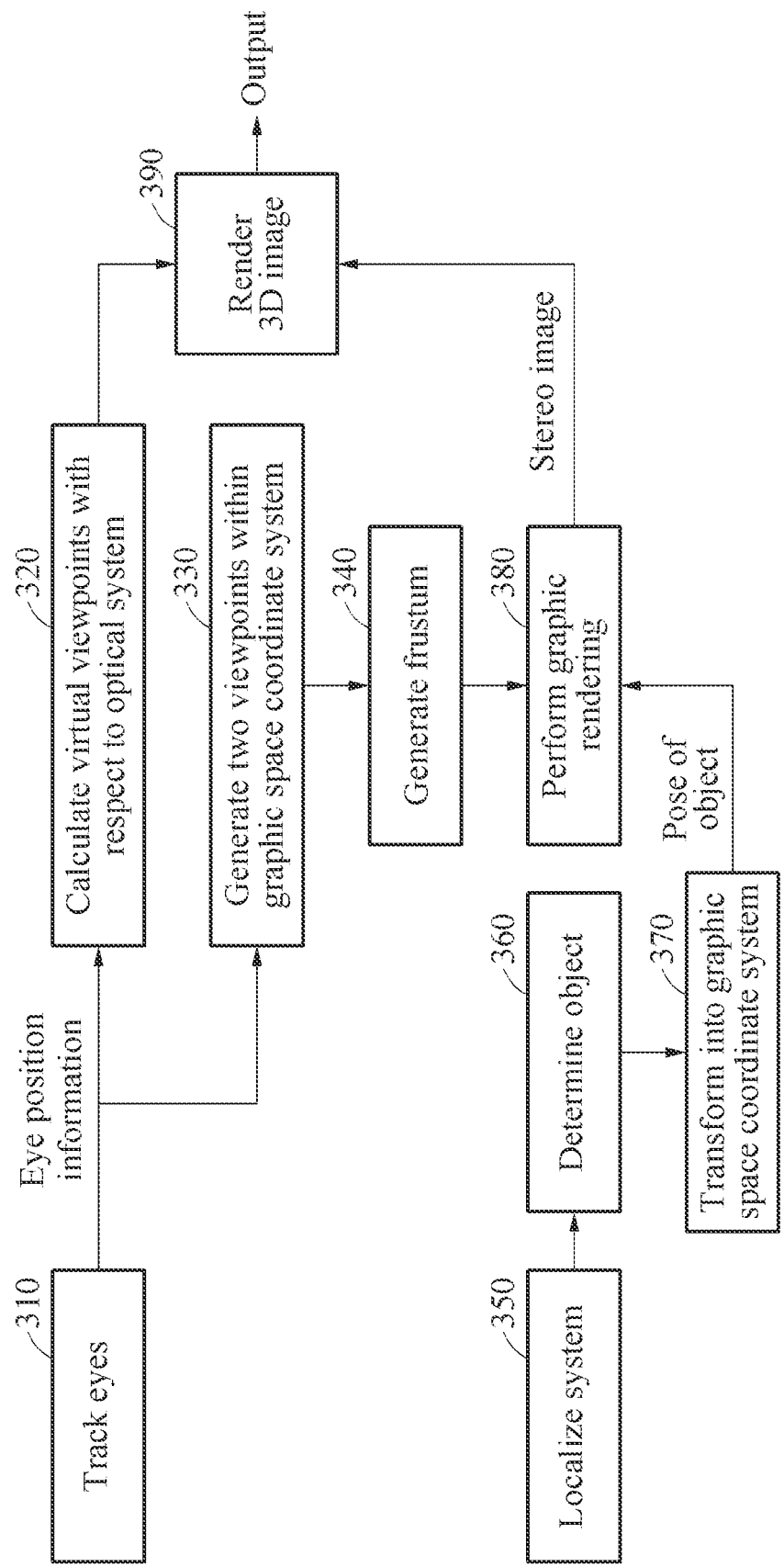
FIG. 3 illustrates a method of outputting a three-dimensional (3D) image according to an exemplary embodiment.

FIG. 3 illustrates a method of outputting a 3D image according to an exemplary embodiment.

The AR content described with reference to FIGS. 1 and 2 may be displayed on a virtual screen by a left image for a left eye of a user and a right image for a right eye of the user. The left image and the right image may be output concurrently on a display panel of the HUD 113, and provided respectively to the left eye and the right eye of the user through an optical layer such as a lenticular lens.

To provide realistic AR content, 1) a process of rendering a 3D image and 2) a process of rendering an image with respect to AR content, for example, AR rendering, may be performed.

The process of rendering a 3D image may be performed through operation 310 of tracking positions of eyes, operation 320 of calculating virtual viewpoints with respect to an optical system, and operation 390 of rendering a 3D image.

The process of rendering an image with respect to AR content may be performed through operation 310 of tracking positions of eyes, operation 330 of generating two viewpoints within a graphic space coordinate system, operation 340 of generating a frustum, operation 350 of localizing a system, operation 360 of determining an object to be output, operation 370 of setting the object within the graphic space coordinate system, and operation 380 of generating a stereo image by rendering the object with graphics.

Prior to describing the process of rendering an image with respect to AR content, a method of rendering and outputting a 3D image will be described first with reference to FIGS. 4 through 12.

Figure 4:
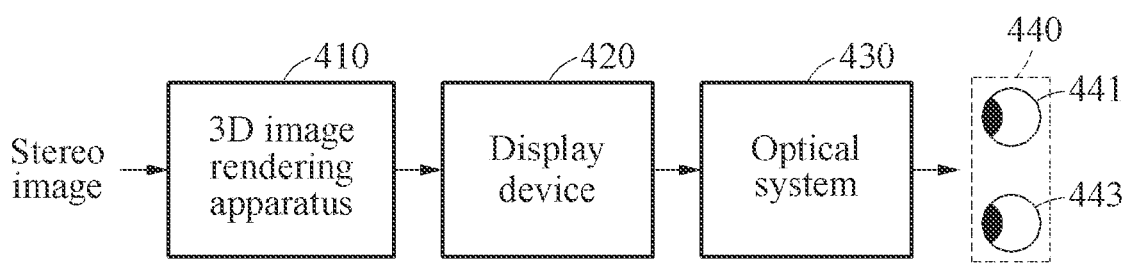
FIG. 4 illustrates a method of rendering and outputting a 3D image based on a stereo image according to an exemplary embodiment.

FIG. 4 illustrates a method of rendering and outputting a 3D image based on a stereo image according to an exemplary embodiment.

A 3D image rendering system 400 may include a 3D image rendering apparatus 410, a display device 420, and an optical system 430. Although FIG. 4 illustrates the display device 420 and the optical system 430 separately, the optical system 430 may include the display device 420. The 3D image rendering system 400 may be included in the content visualizing apparatus 110 of FIG. 1.

The display device 420 may include a display panel and an optical layer. The optical layer may be one of a parallax barrier, a lenticular lens, and a directional backlight unit (BLU). The display panel may include a plurality of pixels, and the 3D image rendering apparatus 410 may assign pixel values corresponding to a predetermined number of viewpoints to the plurality of pixels based on a stereo image. For example, the 3D image rendering apparatus 410 may assign a pixel value corresponding to a first viewpoint 441 to a first pixel, and assign a pixel value corresponding to a second viewpoint 443 to a second pixel. Hereinafter, the first viewpoint 441 and the second viewpoint 443 to be assigned with the pixel values will be referred to as virtual viewpoints. In an example, the virtual viewpoints may include a left viewpoint and a right viewpoint for a single user. In another example, the virtual viewpoints may include a predetermined number of viewpoints for multiple views. The display panel may display a panel image based on the pixel values assigned by the 3D image rendering apparatus 410.

Light from a light source may be provided to the pixels of the display panel. The light source may be, for example, a BLU positioned in the rear of the display panel, or a directional BLU which is an example of the optical layer. When light is provided to the pixels, light corresponding to the pixel values of the pixels may be represented to the user. In this example, the optical layer may restrict a direction in which the light is represented to the user. In detail, a parallax barrier may output light in the restricted direction through slits at a predetermined interval. A lenticular lens may output light in the restricted direction through a curvature of the lens. Further, the directional BLU may provide light to the display panel in the restricted direction.

Light of a direction of the first viewpoint 441 may be provided to the pixel assigned with the pixel value corresponding to the first viewpoint 441, and light of a direction of the second viewpoint 443 may be provided to the pixel assigned with the pixel value corresponding to the second viewpoint 443. The user positioned in a viewing area 440 may view an image corresponding to the first viewpoint 441 through the first viewpoint 441, and view an image corresponding to the second viewpoint 443 through the second viewpoint 443. When the first viewpoint 441 corresponds to a right eye of the user and the second viewpoint 443 corresponds to a left eye of the user, the user may feel stereoscopic effects by viewing the different images concurrently through both eyes.

The images output through the display device 420 may be provided to the user through the optical system 430. The optical system 430 may include a mirror corresponding to a reflective optical system, or a lens corresponding to a refractive optical system. In an example, the display device 420 may be implemented through a small-sized screen, and the optical system 430 may enlarge the images output by the display device 420. For example, the display device 420 and the optical system 430 may be parts of a HUD. In this example, the optical system 430 may include a concave mirror, or a convex lens, and the concave mirror may have a translucent characteristic.

To assign a pixel value to a pixel of the display panel, the 3D image rendering apparatus 410 may determine a path of light passing through the corresponding pixel. Hereinafter, light passing through pixels of the display panel may also be referred to as rays. For example, when a ray passing through the first pixel is provided at the first viewpoint 441, the 3D image rendering apparatus 410 may assign a pixel value corresponding to the first viewpoint 441 to the first pixel.

The 3D image rendering apparatus 410 may consider a refractive index of the display device 420. A first refractive index of a medium between the display panel and the optical layer may differ from a second refractive index of a medium outside of the display device 420. For example, a space between the display panel and the optical layer may be filled with a medium to attach the display panel and the optical layer to each other, and the air may exist outside of the display device 420. In this example, the first refractive index may be determined by the medium between the display panel and the optical layer, and the second refractive index may be determined to be "1" which is a refractive index of the air. The 3D image rendering apparatus 410 may determine a path of a ray in view of a refraction of the ray occurring due to such a difference between the first refractive index and the second refractive index.

According to the Snell's law, when light passes through a boundary between media having different refractive indices, a sine value of an angle of incidence and a sign value of an angle of reflection are determined based on the refractive indices of the media. In general, the direction of the ray may be predicted using an approximate value corresponding to the refractive indices of the media, and the thickness of the parallax barrier or the lenticular lens. However, since such an approximate value is based on a calculation in which a ratio of a tangent value, rather than a ratio of a sine value, is inversely proportional to a ratio of a refractive index, an error may occur when it is impossible to approximate a sine value to a tangent value.

For example, when a normal direction slightly differs from a direction of refraction, an error caused by the approximate value may be small. Conversely, when the normal direction greatly differs from the direction of refraction, a difference between the approximate value and an actual direction of refraction may increase, and an artifact may be observed in a 3D image. Such an artifact caused by the approximate value may increase when the size of the display device 420 increases. The 3D image rendering apparatus 410 may individually apply the calculation according to the refractive indices to all the pixels of the display panel, thereby reducing an occurrence of artifacts.

The path of the ray output from the display device 420 may be changed by the optical system 430. The optical system 430 may change the path of the ray in a direction to enlarge an object. The 3D image rendering apparatus 410 may assign a pixel value in view of an effect of the optical system 430 on the ray. A complex calculation may be required to assign pixel values using the real viewpoints 441 and 443 and optical images of the images output from the display device 420. The 3D image rendering apparatus 410 may determine the optical images with respect to the real viewpoints 441 and 443, and assign pixel values using a positional relationship between the optical images of the real viewpoints 441 and 443 and the 3D display device 420. Through this, the effect of the optical system 430 on the ray may be reflected using a relatively low computational complexity.

When directions of rays are determined, the 3D image rendering apparatus 410 may assign pixel values to pixels of the display panel. The 3D image rendering apparatus 410 may directly determine viewpoints corresponding to the pixels by comparing the directions of the rays to positions of the optical images corresponding to the viewpoints 441 and 443. The optical images corresponding to the viewpoints 441 and 443 may be positioned in a direction of the rear of the display device 420, which will be described in detail below. The 3D image rendering apparatus 410 may determine a closer optical image among the optical images corresponding to the viewpoints 441 and 443, by extending the rays in the direction of the rear of the 3D display device 420. For example, when a first ray extended in the direction of the rear of the display device 420 heads for a vicinity of an optical image corresponding to the first viewpoint 441, the 3D image rendering apparatus 410 may assign the pixel value corresponding to the first viewpoint 441 to a pixel outputting the first ray.

In another example, the 3D image rendering apparatus 410 may indirectly determine a viewpoint corresponding to a pixel based on distances between optical elements and virtual rays which are based on the viewpoints 441 and 443. An optical element may refer to an element which passes light of a restricted direction, such as a slit of the parallax barrier or a curvature of the lenticular lens. For example, the 3D image rendering apparatus 410 may determine a first virtual ray passing through a predetermined pixel and the viewpoint 441 and a second virtual ray passing through the predetermined pixel and the viewpoint 443. The 3D image rendering apparatus 410 may assign the pixel value of the viewpoint 441 to the corresponding pixel when a distance between the first virtual ray and an optical element adjacent to the first virtual ray is less than a distance between the second virtual ray and an optical element adjacent to the second virtual ray.

Figure 5:
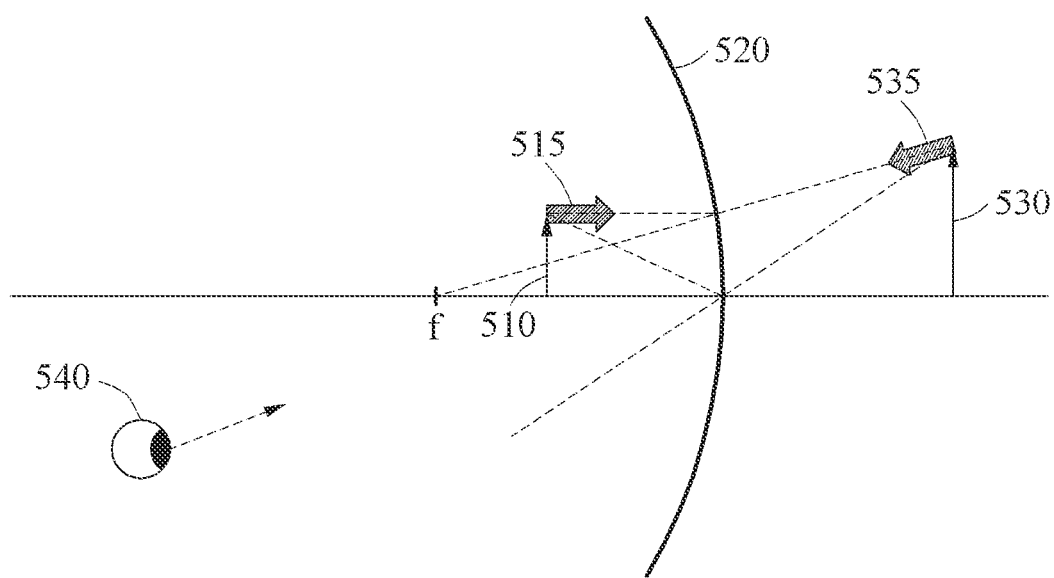
FIGS. 5 and 6 illustrate a process of rendering a 3D image using a concave mirror according to an exemplary embodiment.
Figure 6:
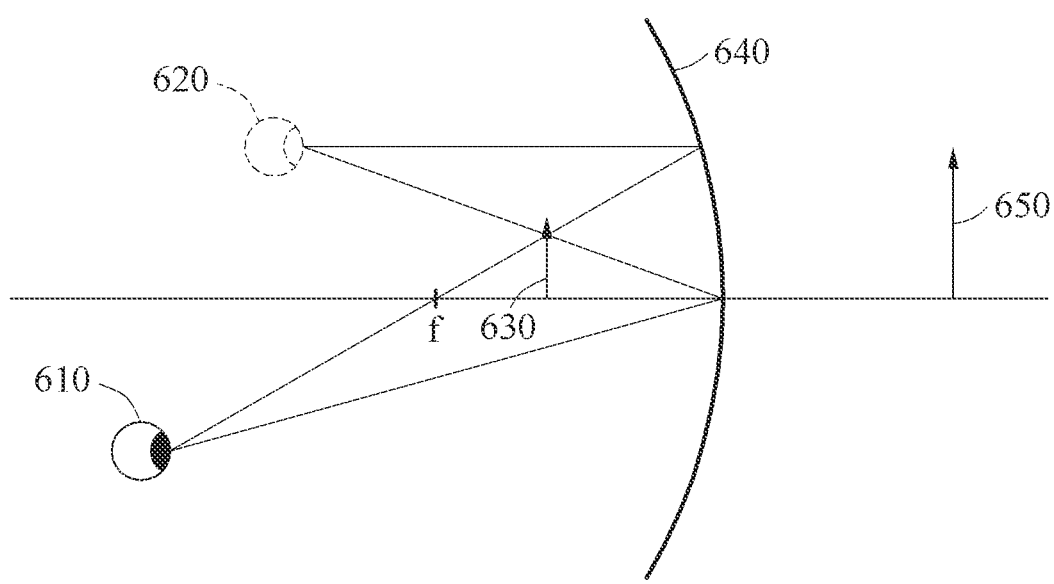

FIGS. 5 and 6 illustrate a process of rendering a 3D image using a concave mirror according to an exemplary embodiment.

Referring to FIG. 5, an object 510 may be output by the display device 420. A position of the object 510 may correspond to a position of the display device 420. An optical image 530 of the object 510 may be determined by applying an optical transform to the object 510. Since the object 510 is positioned within a focus f of a concave mirror 520, the optical image 530 may be an enlarged erect virtual image. The optical transform may be performed based on an optical characteristic of the concave mirror 520 including a curvature and the focus f FIGS. 5 and 6 illustrate a single concave mirror. However, instead of the single concave mirror, various optical systems which generate an optical effect similar to that of the concave mirror may be used.

A user may observe the optical image 530 at a viewpoint 540. Although the display device 420 outputs an image of the object 510 in a direction of an arrow 515, the user may observe the optical image 530 in a direction of an arrow 535. Accordingly, a viewpoint corresponding to a pixel of the display panel needs to be determined in view of an effect of the concave mirror 520. In this example, rather than considering the effect of the concave mirror 520 with respect to all the pixels of the display panel, the 3D image rendering apparatus 410 may apply an optical transform to the viewpoint 540, and assign a pixel to the display panel in a relationship of the object 510 and a viewpoint 620 of FIG. 6 to which the optical transform is applied.

Referring to FIG. 6, a viewpoint 620 with respect to a viewpoint 610 is illustrated. The 3D image rendering apparatus 410 may determine a position of the viewpoint 610 using a viewpoint tracking technique through a separate camera, and determines a position of the viewpoint 620 by applying an optical transform to the position of the viewpoint 610. Similar to an optical image 530, the optical image 650 may be determined through an optical transform corresponding to an optical characteristic of a concave mirror 640. Accordingly, an optical relationship between the viewpoint 610 and the optical image 650 may correspond to an optical relationship between the viewpoint 620 and an object 630. The 3D image rendering apparatus 410 may assign a pixel value to a pixel of the display panel using the viewpoint 620 and the object 630, instead of the viewpoint 610 and the optical image 650. In this example, the 3D image rendering apparatus 410 may determine a viewpoint corresponding to the pixel of the display panel using the viewpoint 620, without applying an optical transform with respect to pixels of the display panel. Thus, a computational complexity for considering the effect of the concave mirror 640 may be reduced.

Figure 7:
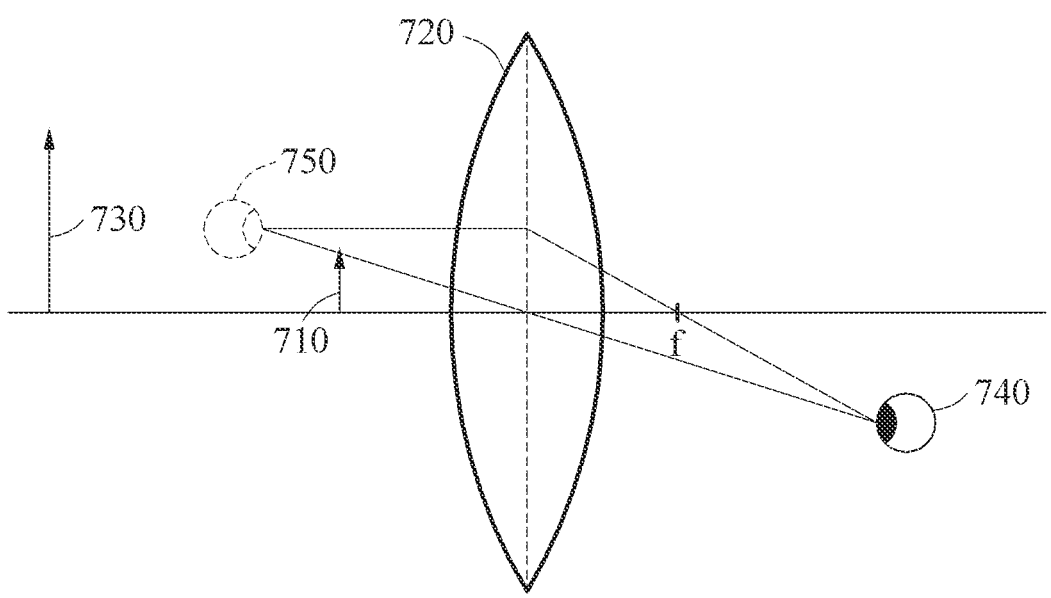
FIGS. 7 and 8 illustrate a process of rendering a 3D image using a convex lens according to an exemplary embodiment.
Figure 8:
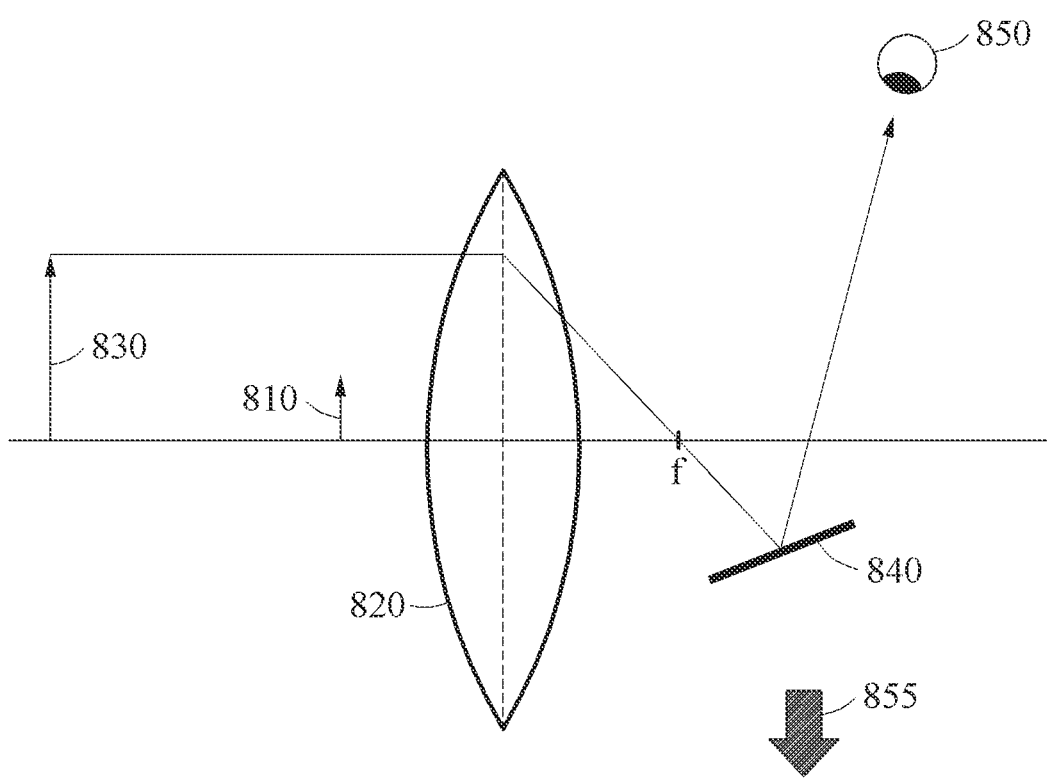

FIGS. 7 and 8 illustrate a process of rendering a 3D image using a convex lens according to an exemplary embodiment.

Referring to FIG. 7, an object 710 may be output by the display device 420. Accordingly, a position of the object 710 may correspond to a position of the display device 420. An optical image 730 of the object 710 may be determined by an optical transform to the object 710. The optical transform may be performed based on an optical characteristic of a convex lens 720 including a curvature and a focus f FIGS. 7 and 8 illustrate a single convex lens. However, instead of the single convex lens, various optical systems which generate an optical effect similar to that of the convex lens may be used.

Similar to the example described with reference to FIGS. 5 and 6, the 3D image rendering apparatus 410 may assign a pixel to the display panel in a relationship of the object 710 and an optical image 750 of a viewpoint 740, rather than considering the effect of the convex lens 720 with respect to all pixels of the display panel. In a case of the convex lens 720, the optical image 730 may be focused behind the display panel. In this example, a user may be at a position at which it is difficult to observe the optical image 730. Thus, an additional optical system may be used such that the user may observe the optical image 730.

Referring to FIG. 8, an object 810 output on the display device 420, a convex lens 820, an optical image 830, a mirror 840, and a viewpoint 850 of the user are illustrated. The mirror 840 may reflect a ray by the optical image 830 such that the user may observe the optical image 830. Accordingly, the user may observe the optical image 830 at a proper position. For example, a system shown in FIG. 8 may be implemented as a part of a HUD, and an arrow 855 may indicate a forward direction of a vehicle. In this example, the mirror 840 may have a translucent characteristic. For example, the mirror 840 may be a windshield of the vehicle. Thus, the user may observe the optical image 830 simultaneously while gazing at the forward direction of the vehicle.

Figure 9:
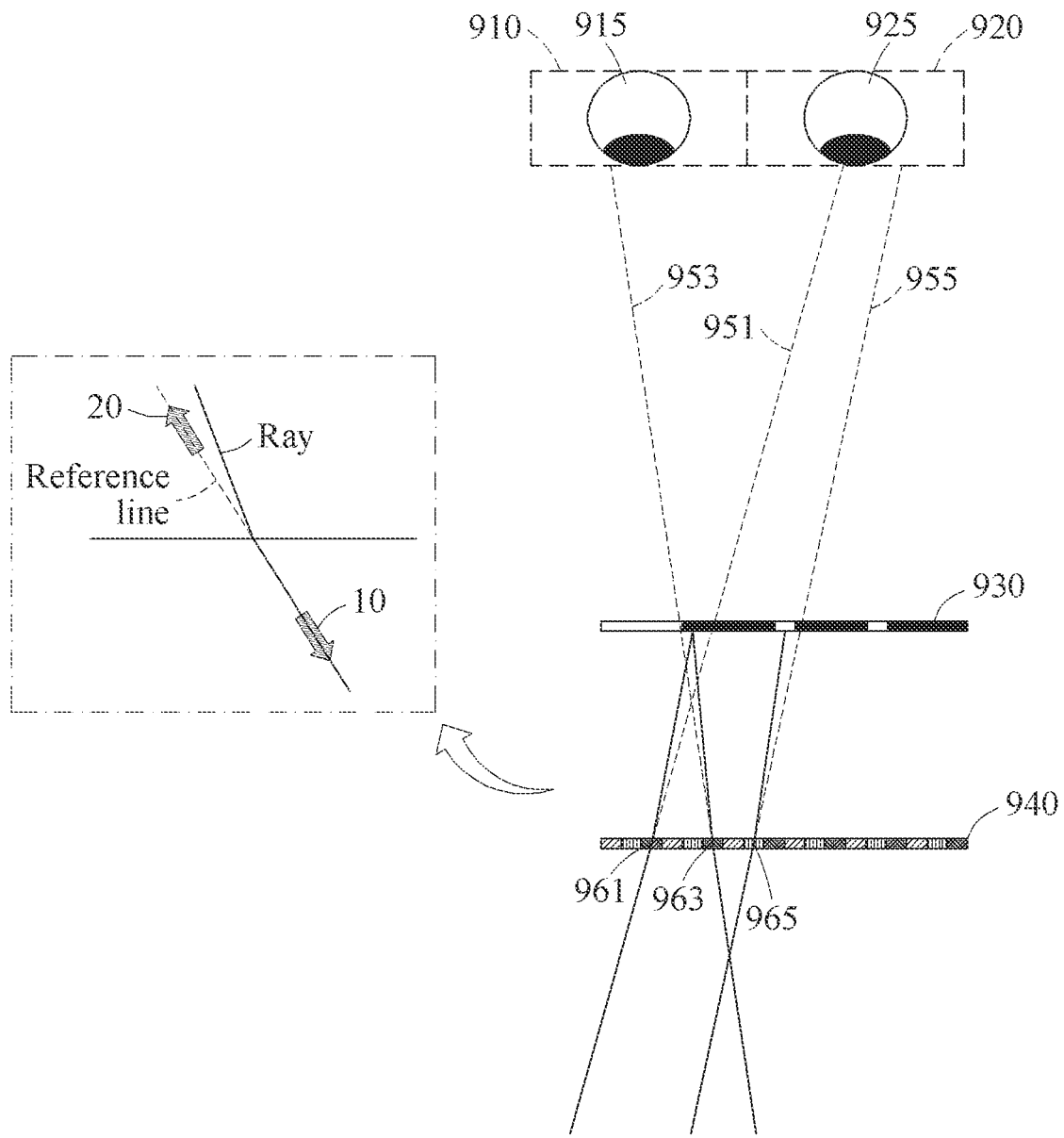
FIG. 9 illustrates a process of setting a viewpoint by calculating a direction of a ray according to an exemplary embodiment.

FIG. 9 illustrates a process of setting a viewpoint by calculating a direction of a ray according to an exemplary embodiment.

Referring to FIG. 9, rays passing through pixels of a display panel 940 and optical elements of an optical layer 930 are illustrated. FIG. 9 illustrates an example in which the optical layer 930 is positioned in the rear of the display panel 940. The optical layer 930 may be a directional BLU.

The 3D image rendering apparatus 410 may determine the rays passing through the pixels of the display panel 940 and the optical elements of the optical layer 930, and determine viewpoints corresponding to the pixels of the display panel 940 based on positions of optical images 915 and 925 and directions of the rays. The optical images 915 and 925 may be determined by optical transforms with respect to virtual viewpoints. For example, the optical image 915 may be determined by an optical transform with respect to a first viewpoint, and the optical image 925 may be determined by an optical transform with respect to a second viewpoint. The optical images 915 and 925 may be positioned in a direction of the rear of the display panel 940 and the optical layer 930. Viewing areas 910 and 920 of a predetermined size may include the optical images 915 and 925. The viewing areas 910 and 920 may be defined based on the positions of the optical images 915 and 925.

The 3D image rendering apparatus 410 may compare the positions of the optical images 915 and 925 and the directions of the rays based on reference lines. The reference lines are determined based on directions of refraction of the rays. For example, the 3D image rendering apparatus 410 may determine reference lines 951, 953, and 955 based on rays passing through pixels 961, 963, and 965. As described above, a refractive index of a medium between the optical layer 930 and the display panel 940 differs from a refractive index of a medium outside of the display device 420. Thus, the rays may be refracted in a direction of a medium having the greater refractive index when passing through the display panel 940. The directions of refraction of the rays may refer to directions in which the rays travel after being refracted. An arrow 10 may indicate a direction of refraction of a ray, and an arrow 20 may indicate a direction opposite to the direction of refraction of the ray. A reference line may be determined to be a line which extends in the direction opposite to the direction of refraction of the ray.

The 3D image rendering apparatus 410 may compare the positions of the optical images 915 and 925 and the reference lines 951, 953, and 955. In an example, the 3D image rendering apparatus 410 may compare the positions of the optical images 915 and 925 and the reference lines 951, 953, and 955 based on the viewing areas 910 and 920. In detail, the reference line 953 may intersect and pass through with the viewing area 910, and the reference lines 951 and 955 may intersect with and pass through the viewing area 920. Accordingly, the 3D image rendering apparatus 410 may assign a pixel value of a viewpoint corresponding to the optical image 915 to the pixel 963 corresponding to the reference line 953, and assign a pixel value of a viewpoint corresponding to the optical image 925 to the pixels 961 and 965 corresponding to the reference lines 951 and 955.

In an aspect, at least two of rays by a single pixel may pass through the viewing areas 910 and 920. In this example, the 3D image rendering apparatus 410 may select one of the at least two candidate rays passing through the viewing areas 910 and 920 based on a preset condition. For example, the 3D image rendering apparatus 410 may select a ray closer to the middle of the viewing areas 910 and 920 from among the at least two rays passing through the viewing areas 910 and 920. The middle of the viewing areas 910 and 920 may be on the boundary between the viewing area 910 and the viewing area 920. In another example, the 3D image rendering apparatus 410 may select a ray closer to the center of each of the viewing areas 910 and 920 from among the at least two rays passing through the viewing areas 910 and 920. When a first ray passing through a first pixel passes through the center of the viewing area 910, and a second ray passing through the first pixel passes through the viewing area 920 but not through the center of the viewing area 920, the 3D image rendering apparatus 410 may select the first ray.

In another aspect, all rays by a second pixel may not pass through the viewing areas 910 and 920. In this example, the 3D image rendering apparatus 410 may assign a pixel value to the second pixel based on a preset condition. For example, the 3D image rendering apparatus 410 may assign a minimum pixel value within a preset range to the second pixel. The pixel value may range between "0" and "255". However, exemplary embodiments are not limited thereto. If all the rays by the second pixel do not pass through the viewing areas 910 and 920, the 3D image rendering apparatus 410 may assign a pixel value of "0" to the second pixel. In another example, the 3D image rendering apparatus 410 may assign, to the second pixel, a viewpoint of a viewing area closest to the rays by the second pixel among viewpoints of the viewing areas 910 and 920. When both a first ray and a second ray by the second pixel do not pass through the viewing area 910, and a distance between the first ray and the viewing area 910 is less than a distance between the second ray and the viewing area 920, the 3D image rendering apparatus 410 may assign a pixel value of a viewpoint corresponding to the viewing area 910 to the second pixel.

The optical images 915 and 925 may correspond to a left viewpoint and a right viewpoint. FIG. 9 illustrates an example in which virtual viewpoints correspond to two viewpoints for a single user. However, in some examples, the virtual viewpoints may correspond to a preset number of viewpoints for multiple views. When the virtual viewpoints correspond to the preset number of viewpoints for multiple views, the 3D image rendering apparatus 410 may determine rays passing through pixels of the display panel 940 and optical elements of the optical layer 930, and assign pixel values to the pixels based on positions of optical images corresponding to the preset number of viewpoints and directions of the rays. The preset number of viewpoints may be at fixed positions, unlike the eyes of the user, and positions of the preset number of viewpoints may be respectively specified by preset representative positions. The 3D image rendering apparatus 410 may determine optical images with respect to the predetermined number of viewpoints based on the representative positions.

Figure 10:
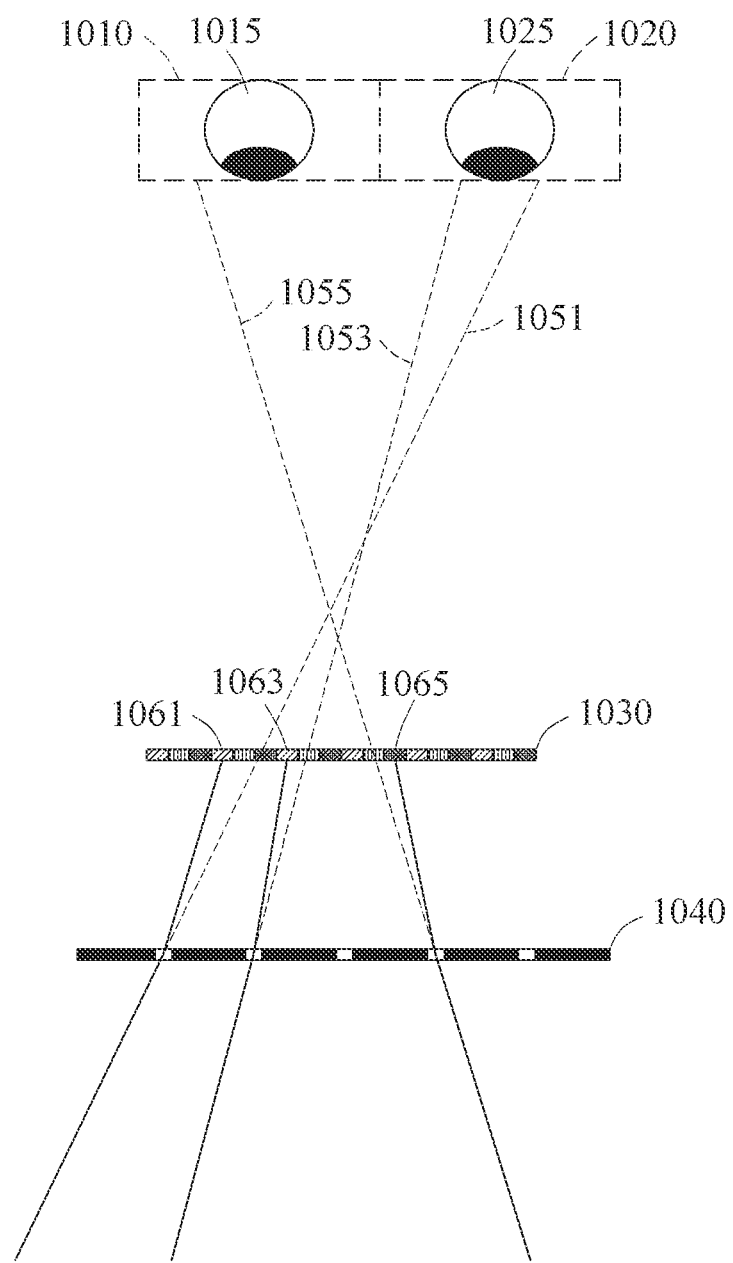
FIG. 10 illustrates a process of setting a viewpoint by calculating a direction of a ray according to an exemplary embodiment.

FIG. 10 illustrates a process of setting a viewpoint by calculating a direction of a ray according to an exemplary embodiment.

Referring to FIG. 10, rays passing through optical elements of an optical layer 1040 and pixels of a display panel 1030 are illustrated. FIG. 10 illustrates an example in which the optical layer 1040 is positioned in front of the display panel 1030. Since the optical layer 1040 is positioned in front of the display panel 1030, the optical layer 1040 may be a parallax barrier or a lenticular lens.

Even when the optical layer 1040 is positioned in front of the display panel 1030, the 3D image rendering apparatus 410 may set viewpoints in a manner similar to the manner of setting viewpoints when the optical layer 930 is positioned in the rear of the display panel 940 as in the example of FIG. 9. In detail, the 3D image rendering apparatus 410 may determine reference lines 1051, 1053, and 1055 based on directions of refraction of the rays, and set viewpoints to pixels of the display panel 1030 based on positions of optical images 1015 and 1025 and the reference lines 1051, 1053, and 1055. The reference line 1055 may intersect with a viewing area 1010, and the reference lines 1051 and 1053 may intersect with a viewing area 1020. Accordingly, the 3D image rendering apparatus 410 may assign a pixel value of a viewpoint corresponding to the optical image 1015 to a pixel 1065 corresponding to the reference line 1055, and assign a pixel value of a viewpoint corresponding to the optical image 1025 to pixels 1061 and 1063 corresponding to the reference lines 1051 and 1053.

Figure 11:
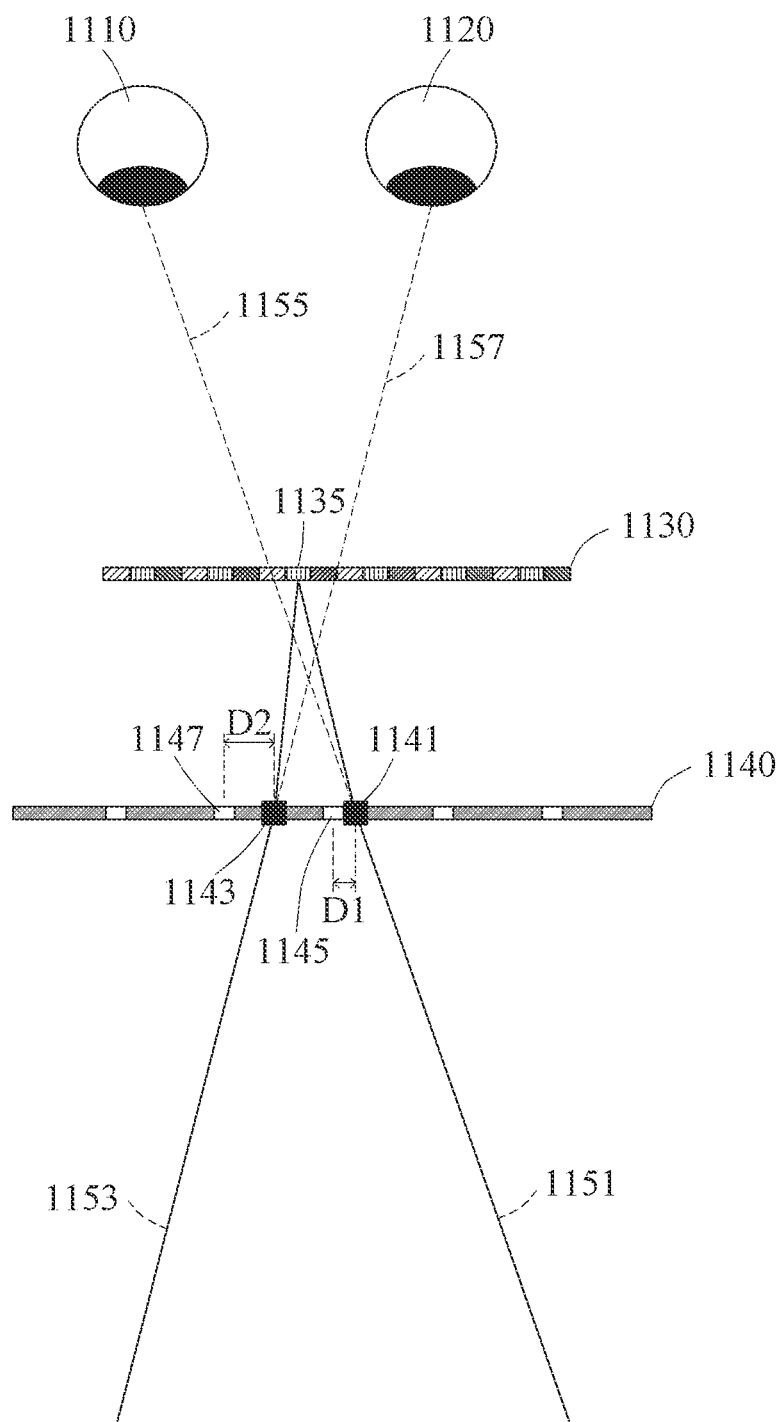
FIG. 11 illustrates a process of setting a viewpoint using an intersection point between a virtual ray and an optical layer according to an exemplary embodiment.

FIG. 11 illustrates a process of setting a viewpoint using an intersection point between a virtual ray and an optical layer according to an exemplary embodiment.

Referring to FIG. 11, virtual rays 1151 and 1153 passing through a pixel 1135 of a display panel 1130 and an optical layer 1140 are illustrated.

The 3D image rendering apparatus 410 may indirectly determine a viewpoint corresponding to a pixel based on distances between optical elements and the virtual rays 1151 and 1153 which are based on optical images 1110 and 1120. A path of a real ray passing through a pixel passes through the center of an optical element. However, the 3D image rendering apparatus 410 may use a virtual candidate ray passing through a predetermined subpixel and a predetermined candidate field of view.

The 3D image rendering apparatus 410 may determine the optical images 1110 and 1120 based on virtual viewpoints, and determine the virtual rays 1151 and 1153 based on the optical images 1110 and 1120. The 3D image rendering apparatus 410 may determine the virtual rays 1151 and 1153 such that the optical images 1110 and 1120 are positioned in directions opposite to directions of refraction of the virtual rays 1151 and 1153. The 3D image rendering apparatus 410 may determine the virtual rays 1151 and 1153 based on reference lines 1155 and 1157 which extend in the directions opposite to the directions in which the virtual rays 1151 and 1153 are refracted. In detail, the 3D image rendering apparatus 410 may determine the virtual rays 1151 and 1153 such that the reference lines 1155 and 1157 may intersect with the optical images 1110 and 1120. The 3D image rendering apparatus 410 may determine the virtual rays 1151 and 1153 in view of a first refractive index of a medium between the display panel 1130 and the optical layer 1140, and a second refractive index of a medium outside of the display device 420 including the display panel 1130 and the optical layer 1140.

When the virtual rays 1151 and 1153 are determined, the 3D image rendering apparatus 410 may determine intersection points 1141 and 1143 between the virtual rays 1151 and 1153 and the optical layer 1140. The 3D image rendering apparatus 410 may determine the intersection points 1141 and 1143 in view of angles of incidence and angles of refraction of the virtual rays 1151 and 1153 according to the first refractive index and the second refractive index. A process of determining the intersection points 1141 and 1143 will be described further with reference to FIG. 12.

When the intersection points 1141 and 1143 are determined, the 3D image rendering apparatus 410 may determine a viewpoint corresponding to the pixel 1135 based on distances D1 and D2 between optical elements 1145 and 1147 of the optical layer 1140 and the intersection points 1141 and 1143. The 3D image rendering apparatus 410 may determine one of the intersection points 1141 and 1143 which is closer to an adjacent optical element, and assign a pixel value of a viewpoint corresponding to the determined intersection point to the pixel 1135. Here, the adjacent optical element refers to an optical element closest to an intersection point among optical elements of the optical layer 1140. For example, the optical element 1145 may be an adjacent optical element of the intersection point 1141, and the optical element 1147 may be an adjacent optical element of the intersection point 1143. When the distance D1 between the intersection point 1141 and the optical element 1145 is less than the distance D2 between the intersection point 1143 and the optical element 1147, the 3D image rendering apparatus 410 may assign a pixel value of a viewpoint corresponding to the optical image 1110 to the pixel 1135. That is because the pixel 1135 is highly likely to be observed by a real ray in a vicinity of the virtual ray 1151, rather than a real ray in a vicinity of the virtual ray 1153.

The optical images 1110 and 1120 may correspond to a left viewpoint and a right viewpoint. FIG. 11 illustrates an example in which virtual viewpoints correspond to two viewpoints for a single user. In some examples, the virtual viewpoints may correspond to a preset number of viewpoints for multiple views. When the virtual viewpoints include the preset number of viewpoints for multiple views, the 3D image rendering apparatus 410 may determine virtual rays to be projected with respect to the preset number of viewpoints, and assign, to the pixel, a pixel value corresponding to one of the preset number of viewpoints based on distances between intersection points by the determined virtual rays and optical elements adjacent to the intersection points. The preset number of viewpoints may be at fixed positions, unlike the eyes of the user, and positions of the preset number of viewpoints may be respectively specified by preset representative positions. The 3D image rendering apparatus 410 may determine optical images with respect to the predetermined number of viewpoints based on the representative positions.

Figure 12:
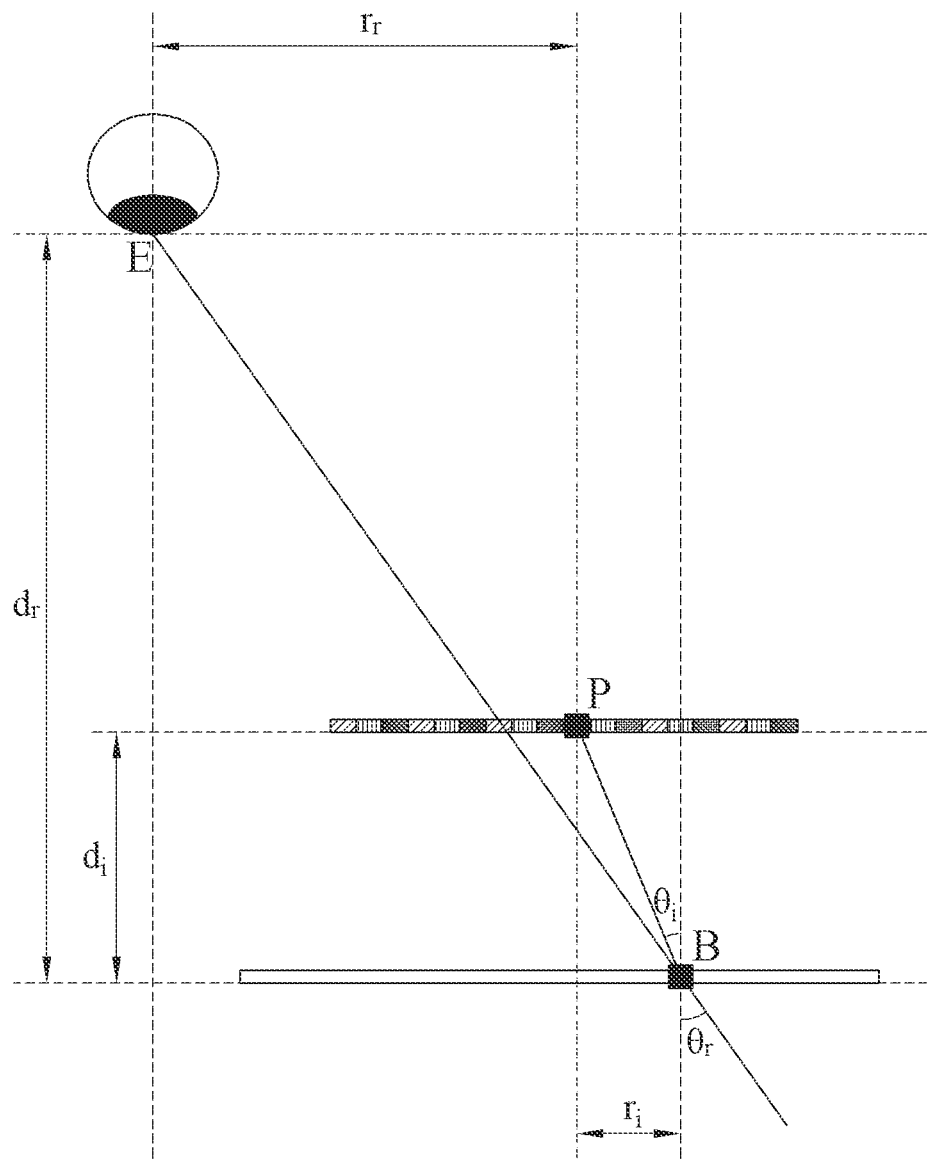
FIG. 12 illustrates a process of determining an intersection point according to an exemplary embodiment.

FIG. 12 illustrates a process of determining an intersection point according to an exemplary embodiment.

Referring to FIG. 12, an optical image E on an r-z plane, a pixel P, and an intersection point B are illustrated. An axis r is defined as an axis corresponding to a straight line obtained by projecting a straight line connecting the optical image E and the pixel P on an x-y plane.

As described above, the 3D image rendering apparatus 410 may determine a virtual ray passing through the pixel P and an optical layer based on the optical image E, and determine the intersection point B between the virtual ray and the optical layer. A position of the optical image E may be indicated as ($x_e$, $y_e$, $z_e$), and a position of the pixel P may be indicated as ($x_p$, $y_p$, $z_p$). In this example, a distance $r_r$ between the optical image E and the pixel P on the axis r may be expressed as given by Equation 1.

$$\sqrt{(x_e-x_p)^2+(y_e-y_p)^2}$$ [Equation 1]

Further, Equation 2 may be established according to the Snell's law.

$$n_i \sin \theta_i = n_r \sin \theta_r$$ [Equation 2]

In Equation 2, $n_i$ denotes a refractive index of a medium between a display device and the optical layer, $n_r$ denotes a refractive index of a medium outside of the display device, $\theta_i$ denotes an angle of incidence, and $\theta_r$ denotes an angle of refraction. Equation 3 may be obtained according to Equation 2, and Equation 4 may be obtained by expanding Equation 3.

$$\frac{n_i r_i}{\sqrt{d_i^2 + r_i^2}} = \frac{n_r(r_r + r_i)}{\sqrt{d_r^2 + (r_r + r_i)^2}}$$ [Equation 3]

$$((n_i^2-n_r^2)r_i^2-n_r^2 d_i^2)(r_i^2+2r_r r_i+2r_r^2)+n_i^2 d_r^2 r_i^2=0$$

In Equation 4, $r_i$ denotes the distance between the pixel P and the intersection point B on the axis r, $d_r$ denotes a distance between the optical image E and the intersection point B on an axis z, and $d_i$ denotes a distance between the pixel P and the intersection point B on the axis z. Equation 5 may be obtained based on Equation 4.

$$ar_i^4+br_i^3+cr_i^2+dr_i^2+e=0$$ [Equation 5]

In Equation 5, coefficients may be defined as follows.

$$a=n_i^2-n_r^2$$

$$b=2(n_i^2-n_r^2)r_r-n_r^2 d_i^2+n_i^2 d_r^2$$

$$c=(n_i^2-n_r^2)r_r^2-n_r^2 d_i^2+n_i^2+n_i^2 d_r^2$$

$$d=-2n_r^2 d_i^2 r_r$$

$$e=-n_r^2 d_i^2 r_r^2$$

According to Equation 5, four solutions may be obtained. The 3D image rendering apparatus 410 may determine a smallest positive solution among the four solutions to be a final solution. Meanwhile, a point on which the optical image E is projected, a point on which the pixel P is projected, and a point on which the intersection point B is projected form a straight line on a two-dimensional (2D) x-y plane. Thus, an x coordinate and a y coordinate of the intersection point B may be calculated as follows.

$$x_b - x_p = -\frac{r_i}{r_r}(x_e - x_p)$$ [Equation 6]

$$y_b - y_p = -\frac{r_i}{r_r}(y_e - y_p)$$ [Equation 7]

The 3D image rendering apparatus 410 may obtain the x coordinate and the y coordinate of the intersection point B by applying $r_r$ obtained through Equation 1, the final solution of $r_i$ obtained through Equation 5, the coordinates of the optical image E, and the coordinates of the pixel P to Equation 6 and Equation 7. A z coordinate of the intersection point B may be obtained through a z coordinate of the pixel P and the distance between the display panel and the optical layer.

The method of generating and outputting a 3D image has been described in detail with reference to FIGS. 4 through 12. Hereinafter, a method of providing AR content as a 3D image to a user in combination with the above method will be described in detail.

Figure 13:
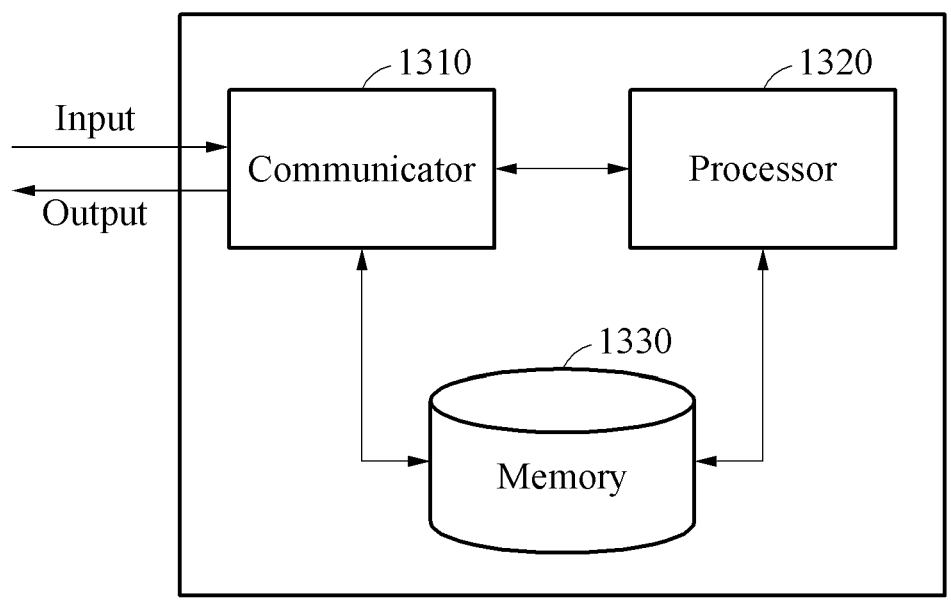
FIG. 13 illustrates a configuration of an electronic device for outputting a 3D image according to an exemplary embodiment.

FIG. 13 illustrates a configuration of an electronic device for outputting a 3D image according to an exemplary embodiment.

Referring to FIG. 13, an electronic device 1300 may include a communicator 1310, a processor 1320, and a memory 1330. The electronic device 1300 may be included in the content visualizing apparatus 110 of FIG. 1. Although not shown, the electronic device 1300 may further includes a HUD corresponding to the HUD 113.

In an example, the electronic device 1300 may be included in a vehicle. In this example, the electronic device 1300 may be an electronic control unit (ECU) of the vehicle, or may be connected to an ECU of the vehicle. In another example, the electronic device 1300 may be included in an image outputting device such as a television.

The electronic device 1300 may further include at least one of a lidar sensor, a radar sensor, and a position sensor. For example, the position sensor may include a global navigation satellite system (GNSS), a global positioning system (GPS), and an inertial measurement unit (IMU).

The electronic device 1300 may include a camera which generates a user image to detect a position of the user, in particular, eye positions.

The communicator 1310 may be implemented as a circuitry in the electronic device 1300. For example, the communicator 1310 may include an internal bus and an external bus. In another example, the communicator 1310 may be an element which connects the electronic device 1300 and an external device. The communicator 1310 may be an interface. The communicator 1310 may receive data from the external device, and transmit the data to the processor 1320 and the memory 1330.

When the electronic device 1300 does not include a radar, the communicator 1310 may receive data obtained from a radar.

The processor 1320 may process the data received by the communicator 1310 and data stored in the memory 1330. The "processor" may be a data processing device implemented by hardware including a circuit having a physical structure to perform desired operations. For example, the desired operations may include instructions or codes included in a program. For example, the hardware-implemented data processing device may include a microprocessor, a central processing unit (CPU), a processor core, a multi-core processor, a multiprocessor, an application-specific integrated circuit (ASIC), and a field programmable gate array (FPGA).

The processor 1320 may execute computer-readable codes, for example software, stored in a memory, for example, the memory 1330, and instructions triggered by the processor 1320.

The memory 1330 may store the data received by the communicator 1310 and the data processed by the processor 1320. For example, the memory 1330 may store the program. The stored program may be a set of syntaxes coded to generate AR content as a 3D image and output the 3D image and executable by the processor 1320.

The memory 1330 may include at least one volatile memory, non-volatile memory, random access memory (RAM), flash memory, hard disk drive, and optical disk drive.

The memory 1330 may store a command set, for example, software, to operate the electronic device 1300. The command set to operate the electronic device 1300 may be executed by the processor 1320.

The communicator 1310, the processor 1320, and the memory 1330 will be described further below with reference to FIGS. 14 through 21.

Figure 14:
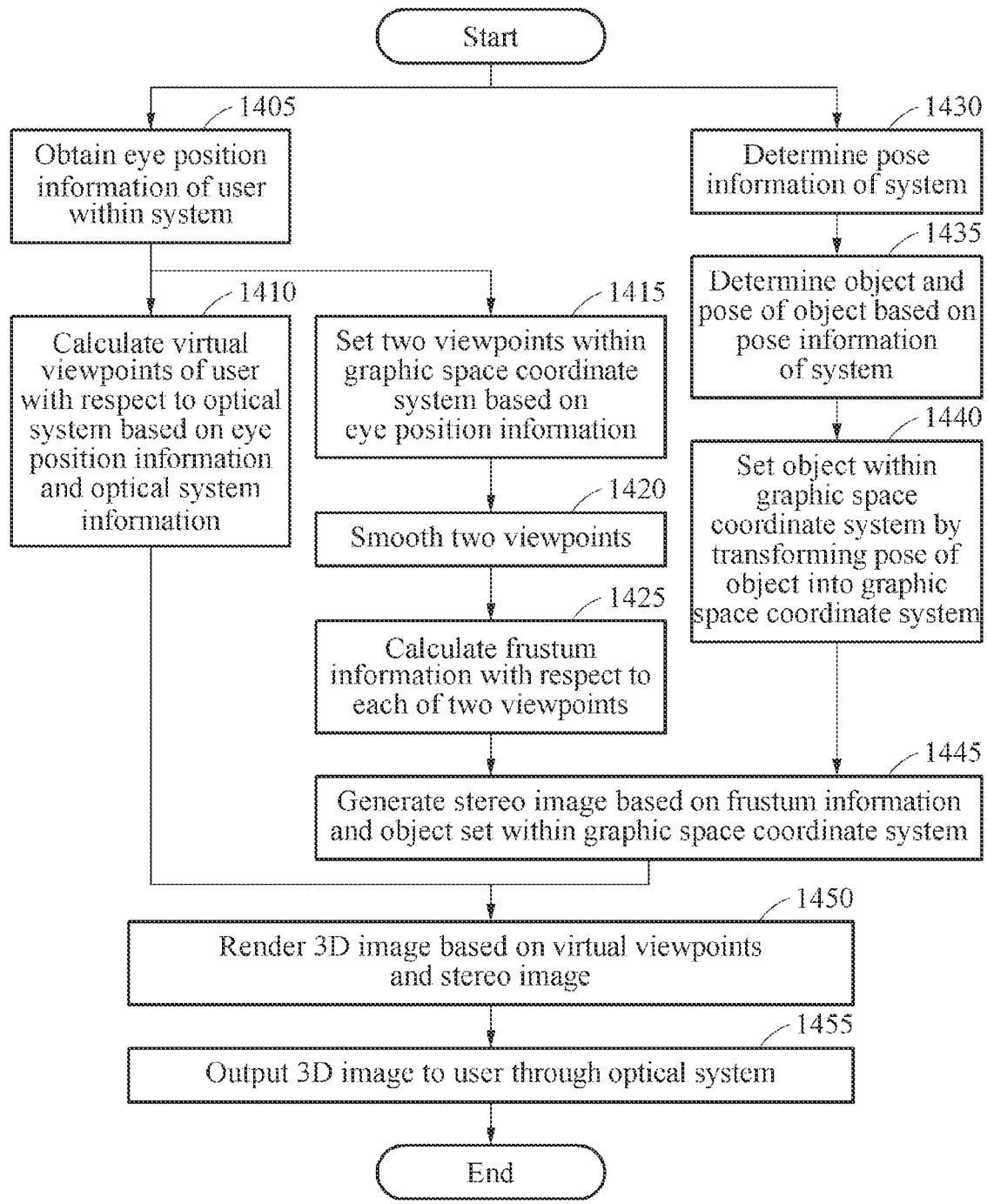
FIG. 14 illustrates a method of outputting a 3D image according to an exemplary embodiment.

FIG. 14 illustrates a method of outputting a 3D image according to an exemplary embodiment.

Operations 1405 through 1455 may be performed by the electronic device 1300 of FIG. 13.

Operations 1405, 1415, 1420, and 1425 and operations 1430, 1435, and 1440 may be performed in parallel. For example, a pipeline for processing operations 1405, 1415, 1420, and 1425 and a pipeline for processing operations 1430, 1435, and 1440 may be independent of each other, and operate at different cycles. That is, the pipelines may asynchronously operate.

In operation 1405, the electronic device 1300 may obtain eye position information of a user within a system. The system may include the user and a device including the electronic device 1300. For example, the system may be the content visualizing system 100 of FIG. 1. The user within the system may be a driver of a vehicle. The electronic device 1300 may receive a user image generated by capturing the user from a camera, and obtain the eye position information based on the user image. For example, obtained eye positions may be represented using a coordinate system of the camera.

In operation 1410, the electronic device 1300 may calculate virtual viewpoints of the user with respect to an optical system based on the eye position information and optical system information. In a case of a single user, virtual viewpoints with respect to positions of both eyes of the user may be calculated. The virtual viewpoints may correspond to the optical images 915 and 925 of FIG. 9, the optical images 1015 and 1025 of FIG. 10, or the optical images 1110 and 1120 of FIG. 11. The virtual viewpoints may correspond to a left viewpoint and a right viewpoint of the user.

The optical system may include optical elements used to present images output from a display panel to the eyes of the user. The optical system information may include an optical characteristic of the optical elements, for example, a concave mirror or a convex lens, included in the optical system.

Operation 1415 and operation 1410 may be performed independently and in parallel. In operation 1415, the electronic device 1300 may set two viewpoints within a graphic space coordinate system based on the eye position information. A graphic space may be a virtual space corresponding to a real space of the system including the electronic device 1300. For example, the graphic space coordinate system may be set based on a coordinate system of the system. The coordinate system of the system may be a global coordinate system. Coordinates of the system may be specified through the position sensor.

A stereo image with respect to an object to be output may be generated based on the two viewpoints set within the graphic space coordinate system through operations 1420, 1425, 1430, 1435, 1440, and 1445. A process of generating the stereo image will be described further below.

In operation 1420, the electronic device 1300 may smooth the at least two viewpoints set within the graphic space coordinate system. For example, currently set two viewpoints may be smoothed such that differences from previously set two viewpoints may not be great. For instance, currently set two viewpoints may be smoothed such that differences from previously set two viewpoints may be smaller than a threshold value.

In operation 1425, the electronic device 1300 may calculate frustum information with respect to each of the at least two viewpoints set within the graphic space coordinate system. A frustum will be described in detail with reference to FIG. 15.

In operation 1430, the electronic device 1300 may determine pose information of the system. The electronic device 1300 may determine the pose information of the system using a position sensor such as a GNSS, a GPS, or an IMU.

In operation 1435, the electronic device 1300 may determine an object to be output, hereinafter, referred to as the "target object", and a pose of the target object based on the pose information of the system. The target object may be presented as AR content. For example, the electronic device 1300 may detect an object positioned in a real space using a radar, and determine the target object to be provided as the AR content based on the detected object. In another example, the electronic device 1300 may determine the target object to be output based on map information stored in advance and the pose information of the system. A target object, for example, an arrow, indicating information related to a driving route may be determined.

The pose of the target object may be a pose with respect to the object of the real space and the system. A different shape may be shown to the user depending on the pose of the target object. The target object needs to be provided as AR content, and thus a matching with the object in the real space may be significant.

In operation 1440, the electronic device 1300 may set the object within the graphic space coordinate system by transforming the pose of the object into the graphic space coordinate system. The object set within the graphic space coordinate system will be described further below with reference to FIG. 16.

In operation 1445, the electronic device 1300 may generate the stereo image based on the frustum information and the object set within the graphic space coordinate system. The stereo image may include a left image for a left eye and a right image for a right eye. A method of generating a stereo image will be described further below with reference to FIG. 17.

In operation 1450, the electronic device 1300 may render a 3D image based on the virtual viewpoints and the stereo image. A method of rendering a 3D image will be described further below with reference to FIG. 18.

In operation 1455, the electronic device 1300 may output the 3D image to the user through the optical system. The electronic device 1300 may output the 3D image to a display pattern, and the output 3D image may be output on a virtual screen through the optical system. The user may feel AR content as being output on the virtual screen through the 3D image.

Figure 15:
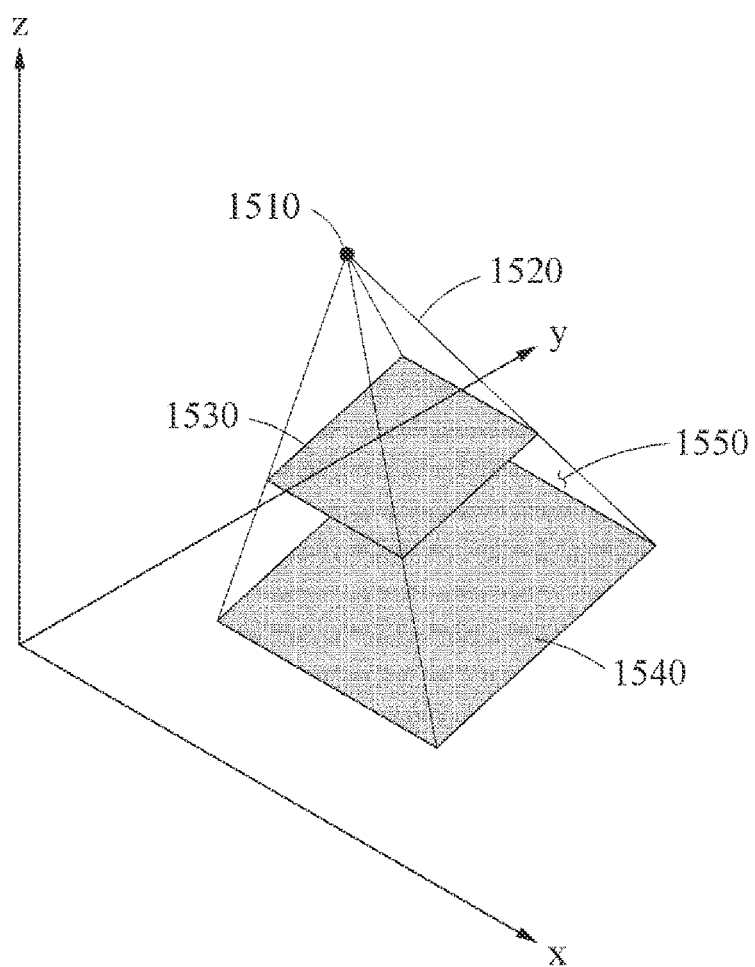
FIG. 15 illustrates a frustum with respect to a viewpoint set within a graphic space coordinate system according to an exemplary embodiment.

FIG. 15 illustrates a frustum with respect to a viewpoint set within a graphic space coordinate system according to an exemplary embodiment.

A pyramidal structure 1520 may be configured based on a first viewpoint 1510 set within a graphic space coordinate system. For example, the first viewpoint 1510 may correspond to a left eye or a right eye of a user. A first plane 1530 and a second plane 1540 may be set within the pyramidal structure 1520 for an image with respect to the first viewpoint 1510. A frustum 1550 may be generated based on the first plane 1530 and the second plane 1540.

In an aspect, at least one of the first plane 1530 and the second plane 1540 may be set based on a virtual screen. When the virtual screen is set within the graphic space coordinate system, the second plane 1540 may be set to be parallel to the virtual screen. Also, the first plane 1530 and the second plane 1540 are parallel.

Figure 16:
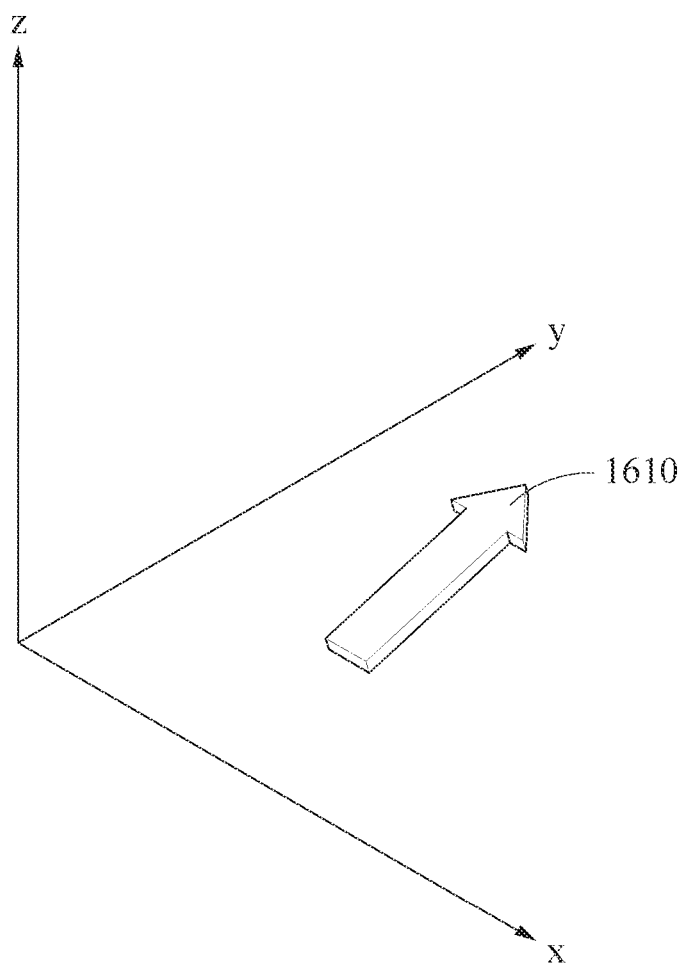
FIG. 16 illustrates an object set within a graphic space coordinate system according to an exemplary embodiment.

FIG. 16 illustrates an object set within a graphic space coordinate system according to an exemplary embodiment.

An object 1610 representing an arrow indicating a direction to a user may be considered. The object 1610 may be a graphic object having a 3D shape. Since the object 1610 has a 3D shape, the user may view a different side of the object 1610 depending on a viewpoint of the user. For example, when the viewpoint of the user changes in an x-axial direction, a right side of the object 1610 may be shown more to the user.

In an aspect, in addition to the object 1610, an object corresponding to an object existing in a real space may be set within the graphic space coordinate system. When the system is a vehicle, objects of a road and another vehicle may be set within the graphic space coordinate system. When other objects exist in the graphic space coordinate system, the pose of the object 1610 may be determined based on a relationship with the other objects. For example, the pose of the object 1610 may be determined such that the object 1610 may be positioned just on the object corresponding to the road.

An example in which the pose of the object 1610 is determined in operation 1435 of FIG. 14 is described above. However, in some examples, the pose of the object 1610 may be determined in operation 1440. For example, the electronic device 1300 may determine the pose of the object 1610 in view of the relationship with the other objects within the graphic space coordinate system, and set the object 1610 within the graphic space coordinate system.

Figure 17:
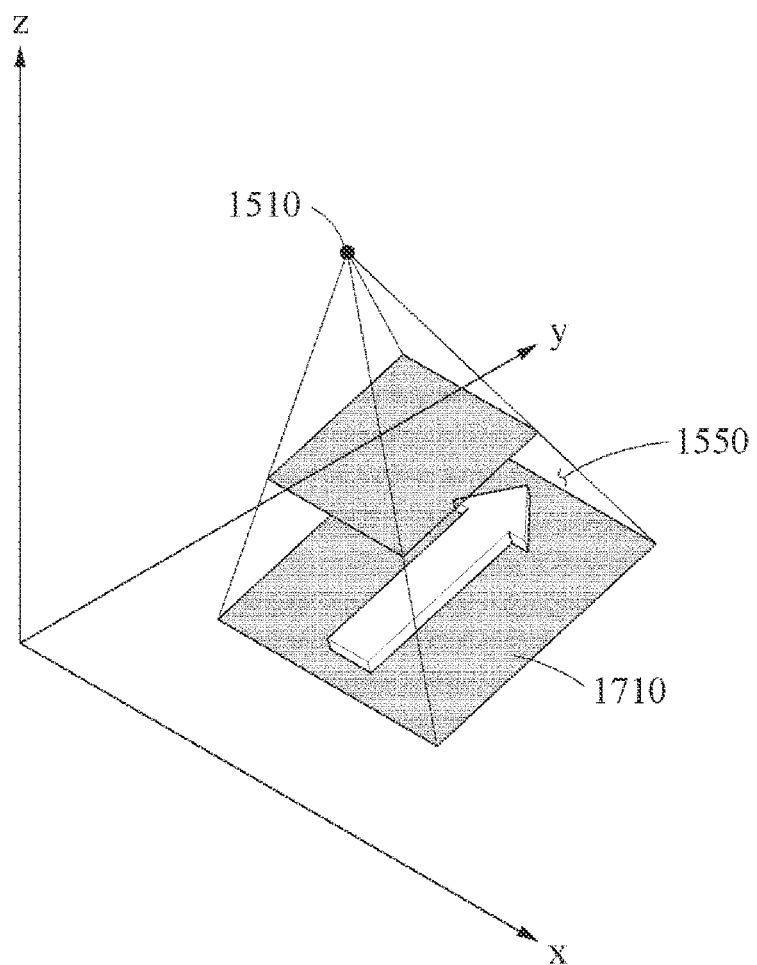
FIG. 17 illustrates a stereo image generated in a graphic space coordinate system according to an exemplary embodiment.

FIG. 17 illustrates a stereo image generated in a graphic space coordinate system according to an exemplary embodiment.

A first image 1710 of a stereo image may be generated based on the frustum 1550 and the object 1610 set within the graphic space coordinate system. While frustum 1550 corresponds to a left eye of the user, a second image of the stereo image may be generated by another frustum (not shown) corresponding to a right eye of the user. The stereo image may include the first image 1710 and the second image. The first image 1710 and the second image may be 2D images reflecting viewpoints of the user.

The first image 1710 may include only an object to be provided as AR content. That is, even when an object of a real space is set within the graphic space coordinate system, the object of the real space may not be included in the first image 1710. When there is a plurality of objects to be provided as AR content, the plurality of objects may be included in the first image 1710.

Figure 18:
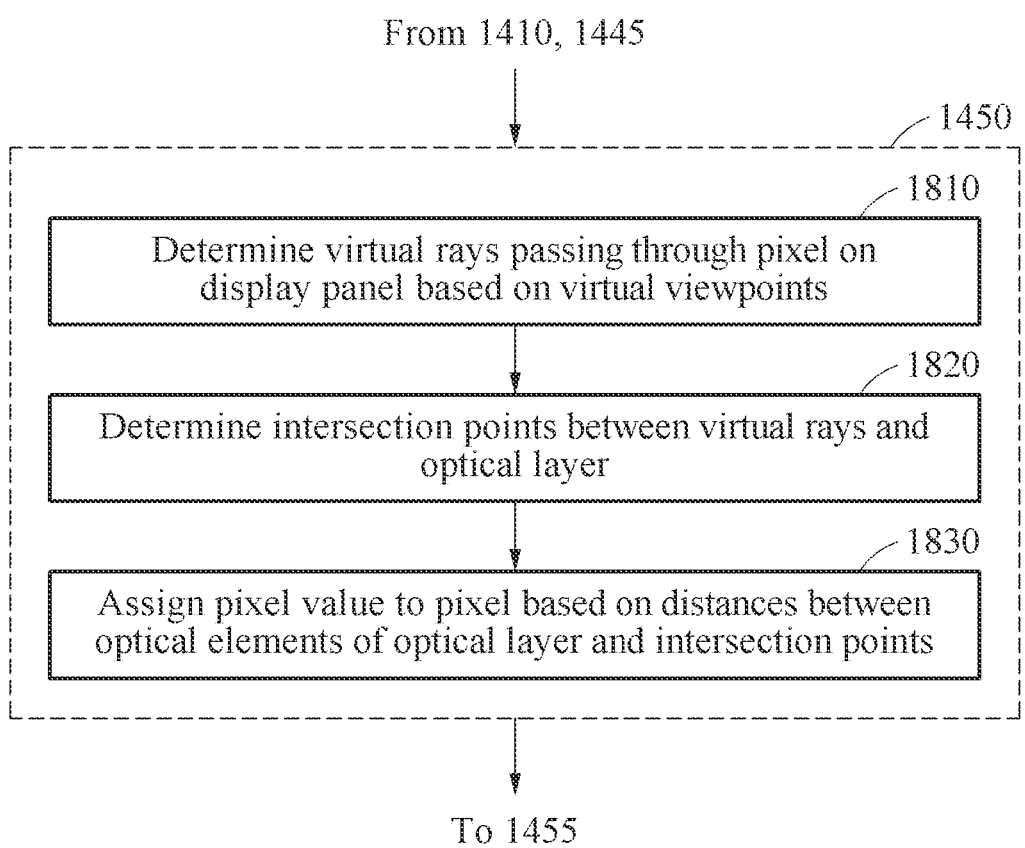
FIG. 18 illustrates a method of rendering a 3D image based on virtual viewpoints and a stereo image according to an exemplary embodiment.

FIG. 18 illustrates a method of rendering a 3D image based on virtual viewpoints and a stereo image according to an exemplary embodiment.

Operation 1450 of FIG. 14 may include operations 1810 through 1830.

In operation 1810, the electronic device 1300 may determine candidate rays passing through a pixel on a display panel based on virtual viewpoints.

In operation 1820, the electronic device 1300 may determine intersection points between the candidate rays and an optical layer.

In operation 1830, the electronic device 1300 may assign a pixel value to the pixel based on distances between optical elements of the optical layer and the intersection points. In addition, the description provided with reference to FIGS. 9 through 12 may apply to the method of rendering a 3D image. Thus, duplicate description will be omitted for conciseness.

Figure 19:
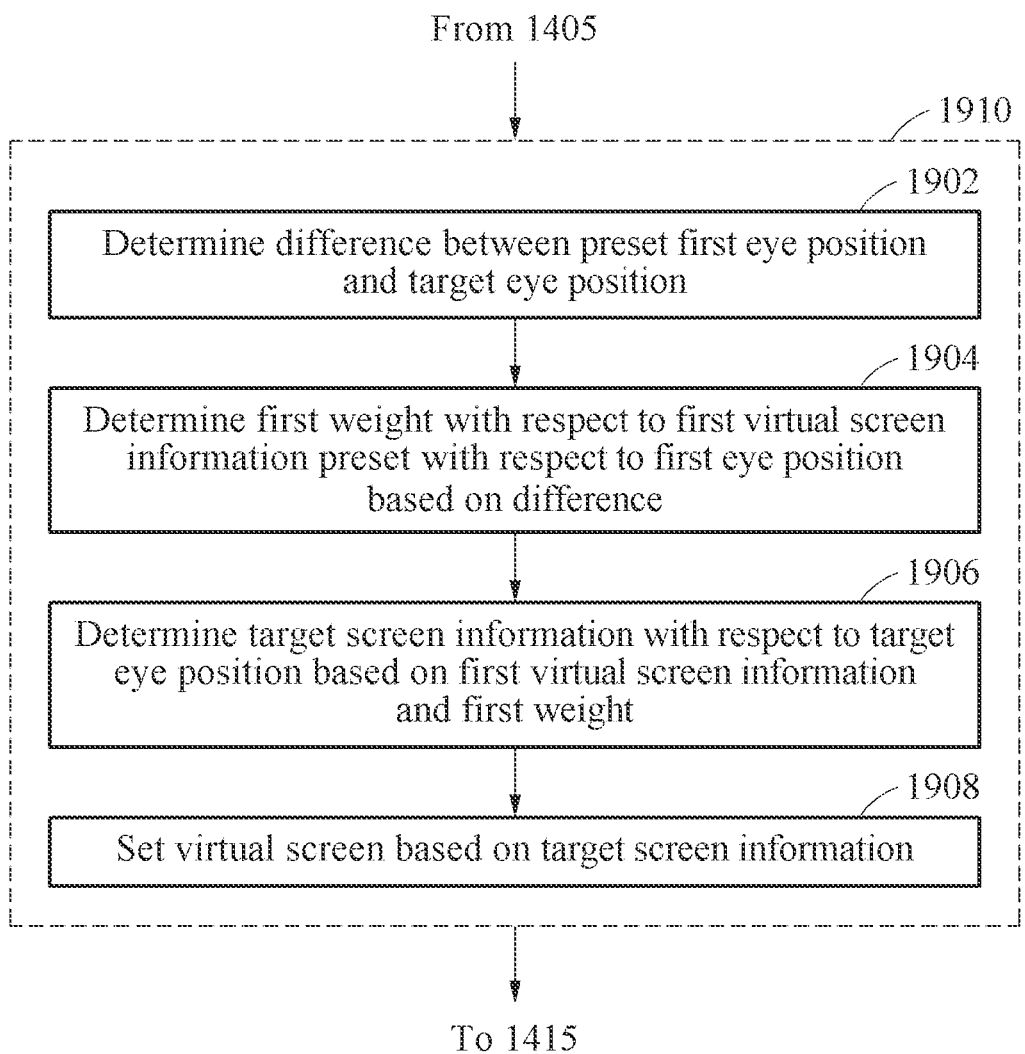
FIG. 19 illustrates a method of setting a virtual screen according to an exemplary embodiment.

FIG. 19 illustrates a method of setting a virtual screen according to an exemplary embodiment.

When operation 1405 of FIG. 14 is performed, operation 1910 may be performed additionally. Operation 1910 may be performed to set a virtual screen. Operation 1910 may include operations 1902 through 1908.

In operation 1902, the electronic device 1300 may determine a difference between a preset first eye position and a target eye position. The target eye position may be an eye position obtained in operation 1405. When a plurality of eye positions is preset, differences between the preset eye positions and the target eye position may be determined. The plurality of preset eye positions will be described further below with reference to FIG. 20.

In operation 1904, the electronic device 1300 may determine a first weight with respect to first virtual screen information preset with respect to the first eye position based on the difference between the first eye position and the target eye position. When the first virtual screen information includes a plurality of parameters, weights with respect to the parameters may be determined. For example, the parameters may be associated with a position, a pose, and a size of a first virtual screen.

In operation 1906, the electronic device 1300 may determine target screen information with respect to the target eye position based on the first virtual screen information and the first weight.

In operation 1908, the electronic device 1300 may set the virtual screen based on the target screen information.

Figure 20:
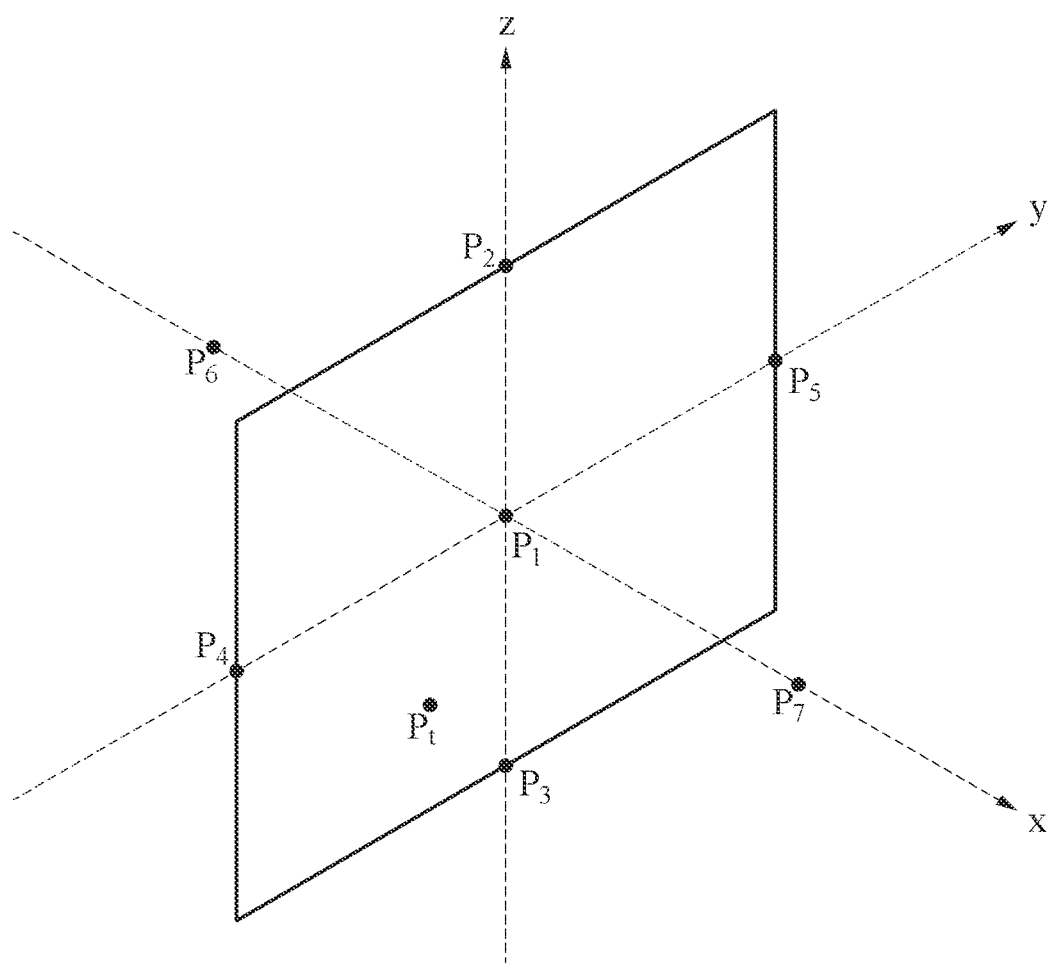
FIG. 20 illustrates a preset eye box according to an exemplary embodiment.

FIG. 20 illustrates a preset eye box according to an exemplary embodiment.

An eye box may be set in a real space, at a position at which eyes of a user are highly likely to be positioned. The eye box is not limited to a plane, and may also be a 3D space. The eye box may correspond to the viewing area 440 of FIG. 4.

Eye positions $P_1$ through $P_7$ may be preset within the eye box. Screen information may be preset with respect to each of the eye positions $P_1$ through $P_7$. For example, parameters indicating a position, a pose, and a size of a first screen may be preset as first screen information with respect to the first eye position $P_1$. When an eye of the user is at the first eye position $P_1$, the first screen information may be preset such that the user may view the virtual screen well at the corresponding position.

When the eye position determined in operation 1405 is a target eye position $P_t$, differences between the eye positions $P_1$ through $P_7$ and the target eye position $P_t$ may be calculated. Weights with respect to virtual screen information of the eye positions $P_1$ through $P_7$ may be calculated based on the calculated differences. Target screen information may be calculated based on the calculated weights.

Figure 21:
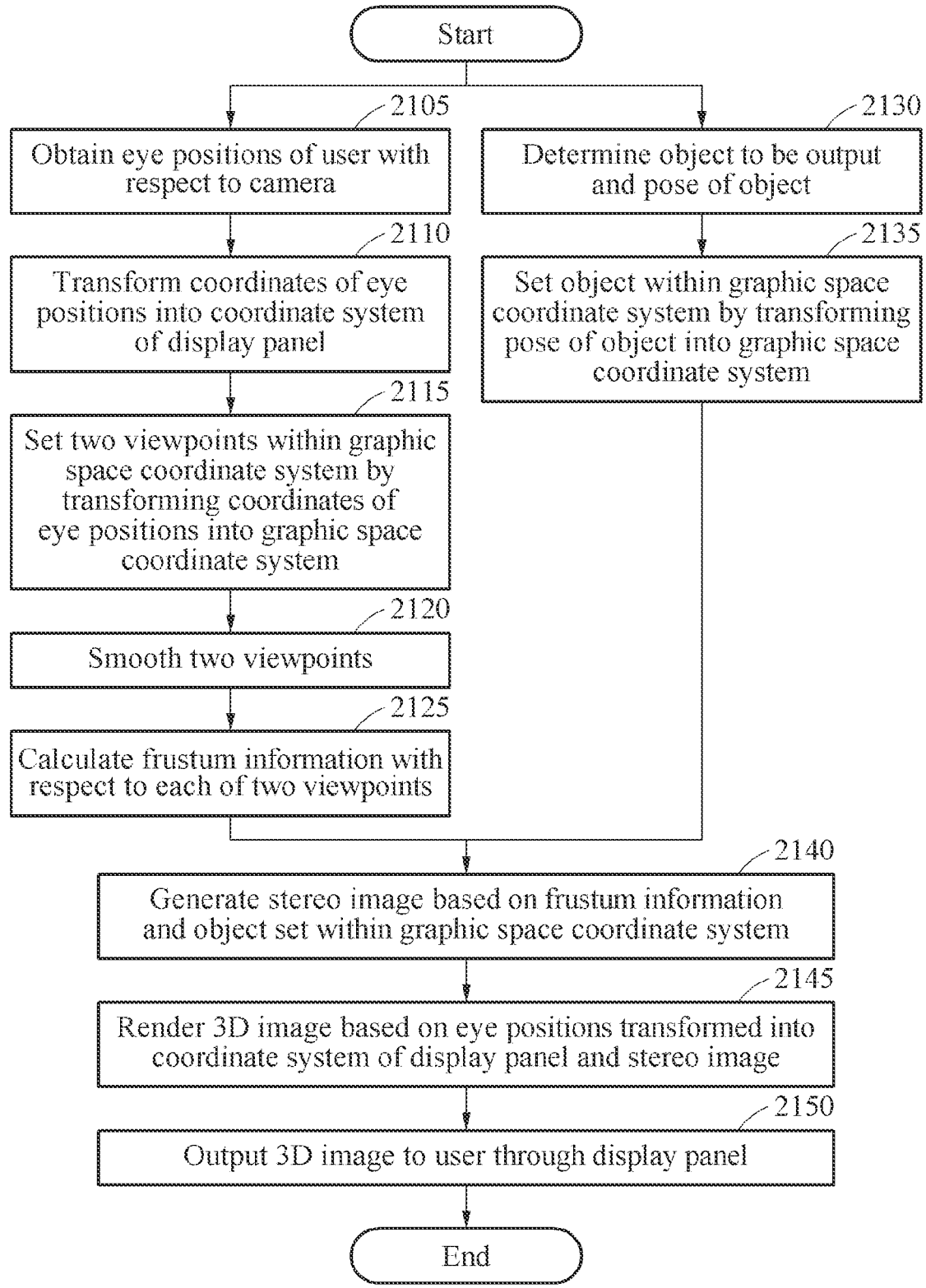
FIG. 21 illustrates a method of outputting a 3D image according to an exemplary embodiment.

FIG. 21 illustrates a method of outputting a 3D image according to an exemplary embodiment.

The examples of FIGS. 1 through 20 relate to a method of outputting a 3D image when a system includes a vehicle, and an example of FIG. 21 relates to a method of outputting a 3D image when the system includes a display such as a television or a monitor. The description provided with reference to FIGS. 1 through 20 may similarly apply to the method of FIG. 21. However, the two methods are different in that a user may view a real object, for example, a scene, and AR content at the same time through a windshield in the examples of FIGS. 1 through 20, whereas a user may view an image output through the display, rather than viewing a real object, in the example of FIG. 21. The image output through the display may include a basic image and AR content further output on the basic image.

Operations 2105 through 2150 may be performed by the electronic device 1300 described with reference to FIGS. 13 through 20.

In operation 2105, the electronic device 1300 may obtain eye positions of a user with respect to a camera. When there is a plurality of users, eye positions of the plurality of users may be obtained.

In operation 2110, the electronic device 1300 may transform coordinates of the eye positions into a coordinate system of a display panel.

In operation 2115, the electronic device 1300 may set two viewpoints within a graphic space coordinate system by transforming the eye positions, transformed into the coordinate system of the display panel, into the graphic space coordinate system.

In operation 2120, the electronic device 1300 may smooth the two viewpoints set within the graphic space coordinate system.

In operation 2125, the electronic device 1300 may calculate frustum information with respect to each of the two viewpoints.

Operations 2105 through 2125 and operations 2130 through 2135 may be performed independently and in parallel.

In operation 2130, the electronic device 1300 may determine an object to be output and a pose of the object. The electronic device 1300 may detect a scene of a basic image output through the display or a basic object based on the basic image, and determines the object to be output as AR content based on the detected scene or the detected basis object. For example, the AR content may further provide information related to the basic image to the user.

A pose of the determined object may be determined based on the scene or the basic object. When the basic image is provided in form of a 3D image, a depth to which the AR content is to be output may be determined to be the pose of the object. In another example, a positional relationship with the basic object may be determined to be the pose of the object.

In operation 2135, the electronic device 1300 may set the object within the graphic space coordinate system by transforming the pose of the object into the graphic space coordinate system.

In operation 2140, the electronic device 1300 may generate a stereo image based on the frustum information and the object set within the graphic space coordinate system.

In operation 2145, the electronic device 1300 may render a 3D image based on the eye positions transformed into the coordinate system of the display panel and the stereo image.

In operation 2150, the electronic device 1300 may output the 3D image to the user through the display panel.

The methods according to the above-described exemplary embodiments may be recorded in non-transitory computer-readable media including program instructions to implement various operations of the above-described exemplary embodiments. The media may also include, alone or in combination with the program instructions, data files, data structures, and the like. The program instructions recorded on the media may be those specially designed and constructed for the purposes of exemplary embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described exemplary embodiments, or vice versa.

A number of exemplary embodiments have been described above. Nevertheless, it should be understood that various modifications may be made to these exemplary embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method performed by an electronic device for outputting a three-dimensional (3D) image, the method comprising:
    obtaining eye position information of a user in a coordinate system of a display panel;
    calculating virtual viewpoints of the user with respect to an optical system based on the eye position information and optical system information corresponding to the optical system;
    transforming the coordinate system of the display panel into a graphic space coordinate system;

setting at least two viewpoints within the graphic space coordinate system based on the eye position information;

setting an object to be output within the graphic space coordinate system by transforming a pose of the object into the graphic space coordinate system;

generating a stereo image with respect to the object to be output on a virtual screen based on the at least two viewpoints set within the graphic space coordinate system; and rendering a 3D image based on the virtual viewpoints and the stereo image to the user through the optical system, wherein the graphic space coordinate system is a global coordinate system of a virtual 3D space corresponding to a real space of a system including the electronic device, and wherein the generating the stereo image comprises:

setting a first plane and a second plane within a pyramidal structure with respect to each of the at least two viewpoints within the graphic space coordinate system;

generating frustum information based on the first plane and the second plane;

determining the pose of the object based on pose information of a system in which the user is present; and generating the stereo image based on the frustum information and the object set within the graphic space coordinate system.

2. The method of claim 1, wherein the generating the stereo image comprises:

calculating the frustum information with respect to each of the at least two viewpoints set within the graphic space coordinate system.

3. The method of claim 2, further comprising:

setting the virtual screen based on the eye position information, wherein the calculating of the frustum information comprises generating the frustum information based on the virtual screen.

4. The method of claim 3, wherein the setting of the virtual screen comprises:

determining a difference between a first eye position and a target eye position;

determining a first weight with respect to first virtual screen information preset with respect to the first eye position based on the difference between the first eye position and the target eye position;

determining target virtual screen information with respect to the target eye position based on the first virtual screen information and the first weight; and setting the virtual screen based on the target virtual screen information.

5. The method of claim 4, wherein the first eye position is preset within an eye box set in a space within the system.

6. The method of claim 2, further comprising:

smoothing the at least two viewpoints set within the graphic space coordinate system, wherein the calculating of the frustum information comprises calculating the frustum information based on the smoothed at least two viewpoints.

7. The method of claim 1, wherein the optical system comprises the display panel configured to output the 3D image, and the virtual viewpoints are positioned in a rear portion of the display panel.

8. The method of claim 7, wherein the rendering comprises:

determining virtual rays passing through a pixel on the display panel based on the virtual viewpoints;

determining intersection points between the virtual rays and an optical layer; and assigning a pixel value to the pixel based on distances between optical elements of the optical layer and the intersection points.

9. The method of claim 8, wherein the determining of the virtual rays comprises determining the virtual rays based on a first refractive index of a medium between the optical layer and the display panel, and a second refractive index of a medium outside of a display device including the optical layer and the display panel.

10. The method of claim 1, wherein the optical system information comprises information about an optical characteristic of a concave mirror or a convex lens included in the optical system.

11. The method of claim 1, wherein the system is a vehicle, and the virtual screen is set outside of the vehicle.

12. The method of claim 11, wherein the optical system comprises a windshield of the vehicle.

13. A non-transitory computer-readable storage medium storing instructions that, when executed by a processor, cause the processor to perform the method of claim 1.

14. An electronic device for outputting a three-dimensional (3D) image, the electronic device comprising:

a memory configured to record a program to output a 3D image; and a processor configured to execute the program to perform:

calculating virtual viewpoints of a user within a system with respect to an optical system based on eye position information of the user in a coordinate system of a display panel and optical system information corresponding to the optical system;

transforming the coordinate system of the display panel into a graphic space coordinate system;

setting at least two viewpoints within the graphic space coordinate system based on the eye position information;

setting an object to be output within the graphic space coordinate system by transforming a pose of the object into the graphic space coordinate system;

generating a stereo image with respect to the object to be output on a virtual screen based on the at least two viewpoints set within the graphic space coordinate system; and rendering a 3D image based on the virtual viewpoints and the stereo image to the user through the optical system, wherein the graphic space coordinate system is a global coordinate system of a virtual 3D space corresponding to a real space of a system including the electronic device, and wherein the generating the stereo image comprises:

setting a first plane and a second plane within a pyramidal structure with respect to each of the at least two viewpoints within the graphic space coordinate system;

generating frustum information based on the first plane and the second plane;

determining the pose of the object based on pose information of a system in which the user is present; and generating the stereo image based on the frustum information and the object set within the graphic space coordinate system.

15. The electronic device of claim 14, wherein the generating the stereo image comprises:

calculating the frustum information with respect to each of the at least two viewpoints set within the graphic space coordinate system.

16. The electronic device of claim 14, further comprising:
a camera configured to generate the eye position information of the user within the system.

17. The electronic device of claim 14, further comprising:
a display device including the display panel configured to output the rendered 3D image.

18. The electronic device of claim 14, wherein the system is a vehicle, and the electronic device is installed in the vehicle.

19. A method of outputting a three-dimensional (3D) image, the method comprising:
obtaining eye positions of a user with respect to a camera;
transforming coordinates of the eye positions into a coordinate system of a display panel;
transforming the coordinate system of the display panel into a graphic space coordinate system;
setting two viewpoints within the graphic space coordinate system;
setting an object to be output within the graphic space coordinate system by transforming a pose of the object into the graphic space coordinate system;
generating a stereo image with respect to the object to be output based on the two viewpoints set within the graphic space coordinate system; and
rendering a 3D image based on the eye positions transformed into the coordinate system of the display panel and the stereo image through the display panel,
wherein the graphic space coordinate system is a global coordinate system of a virtual 3D space corresponding to a real space of a system including an electronic device, and
wherein the generating the stereo image comprises:
setting a first plane and a second plane within a pyramidal structure with respect to each of the at least two viewpoints within the graphic space coordinate system;
generating frustum information based on the first plane and the second plane;
determining the pose of the object based on pose information of a system in which the user is present; and
generating the stereo image based on the frustum information and the object set within the graphic space coordinate system.

20. The method of claim 19, wherein the generating comprises:
calculating the frustum information with respect to each of the two viewpoints set within the graphic space coordinate system.

* * * * *